United States Patent
Brunazzi et al.

(10) Patent No.: US 9,410,582 B2
(45) Date of Patent: Aug. 9, 2016

(54) PROTECTIVE DEVICE FOR UNIVERSAL JOINT TRANSMISSIONS

(71) Applicant: COMER INDUSTRIES S.P.A., Milan (IT)

(72) Inventors: Achille Brunazzi, Gualtieri (IT); Massimo Tondelli, Campagnola Emilia (IT)

(73) Assignee: COMER INDUSTRIES S.P.A., Milan (IT)

( * ) Notice: Subject to any disclaimer, the term of this patent is extended or adjusted under 35 U.S.C. 154(b) by 0 days.

(21) Appl. No.: 14/340,722

(22) Filed: Jul. 25, 2014

(65) Prior Publication Data
US 2015/0038245 A1 Feb. 5, 2015

(30) Foreign Application Priority Data
Jul. 31, 2013 (IT) .............................. MO2013A0219

(51) Int. Cl.
*F16D 3/64* (2006.01)
*F16D 3/84* (2006.01)
*F16D 3/10* (2006.01)
*F16D 3/06* (2006.01)

(52) U.S. Cl.
CPC ........ *F16D 3/843* (2013.01); *F16D 3/10* (2013.01); *F16D 3/848* (2013.01); *F16D 3/06* (2013.01)

(58) Field of Classification Search
CPC ............. F16D 3/06; F16D 3/10; F16D 3/843; F16D 3/848
USPC ......................... 464/172–175, 178
See application file for complete search history.

(56) References Cited

U.S. PATENT DOCUMENTS 3,113,441 A * 12/1963 Weasler ................. F16D 3/841
                                                     464/172
6,186,901 B1 * 2/2001 Bondioli ................ A01B 71/08
                                                     464/172 X

FOREIGN PATENT DOCUMENTS

| DE | 19541511 C1 | 4/1997 | |
| EP | 0465440 A1 | 1/1992 | |
| FR | 1357007 * | 2/1964 | ................... 464/171 |
| FR | 2187053 A7 | 1/1974 | |
| GB | 1394325 A | 5/1975 | |
| WO | 98/06956 A1 | 2/1998 | |

OTHER PUBLICATIONS

Italian Search Report dated Apr. 3, 2014 for Italian Application No. IT MO2013A000219 filed Jul. 31, 2013, 2 pages.

* cited by examiner

Primary Examiner — Gregory Binda
(74) Attorney, Agent, or Firm — Brooks Kushman P.C.

(57) ABSTRACT

A protective device for universal joint transmissions has at least two coaxial tubular protective elements, with the two tubular protective elements each having, at their opposite ends, a protective hood. The two tubular protective elements each having a locator flange associated rigidly with the tubular protective element. The protective hood has a coupling flange that is coaxial to the locator flange and is adapted to abut against the locator flange. The protective hood has a cylindrical accordion portion supported by the coupling flange. The protective hood also has at least one fastening element adapted to fasten the coupling flange on the locator flange. The protective device has at least one supporting ring, which has engagement elements for the engagement of the supporting ring with the locator flange, which is accommodatable rotatably in an annular seat provided at the outer surface of the hub of the fork of the joint.

20 Claims, 21 Drawing Sheets

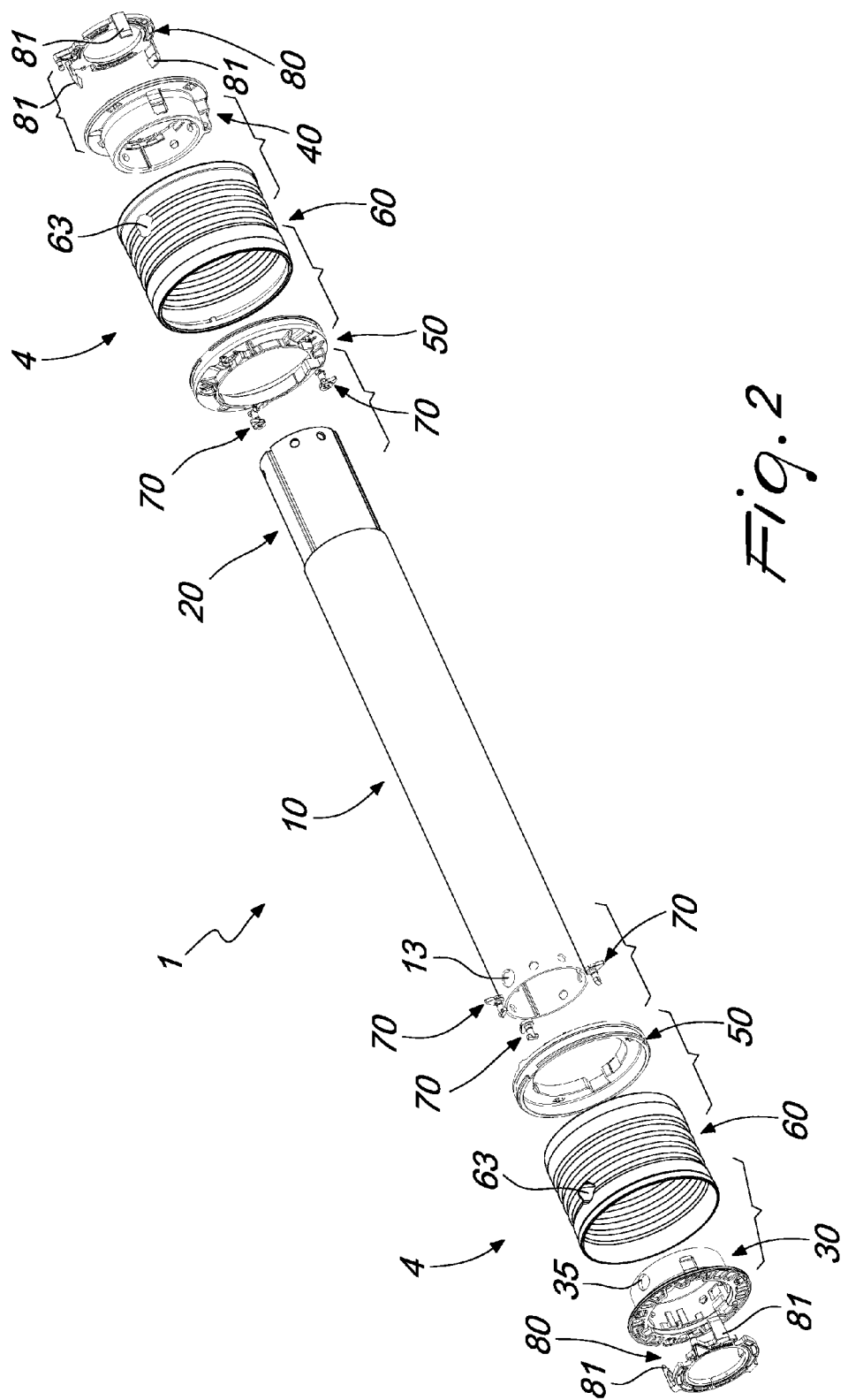

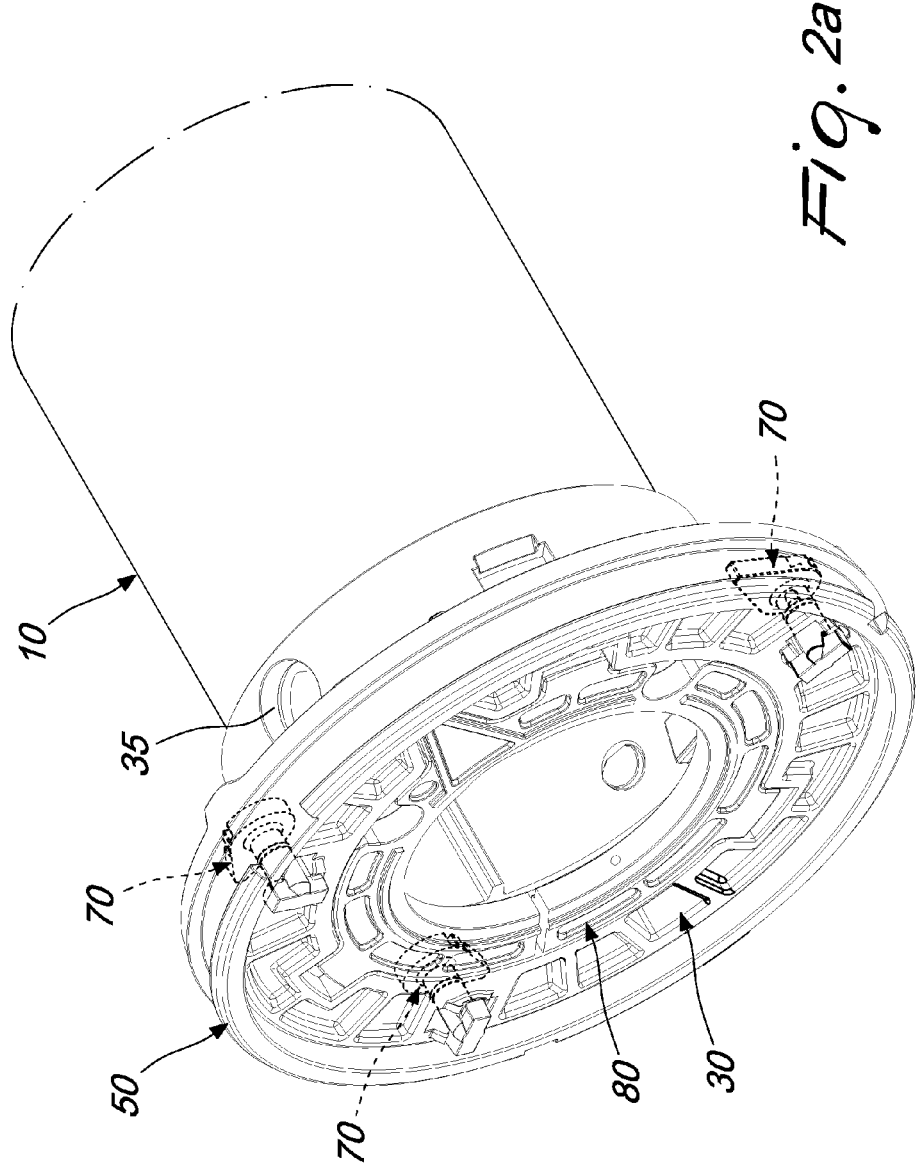

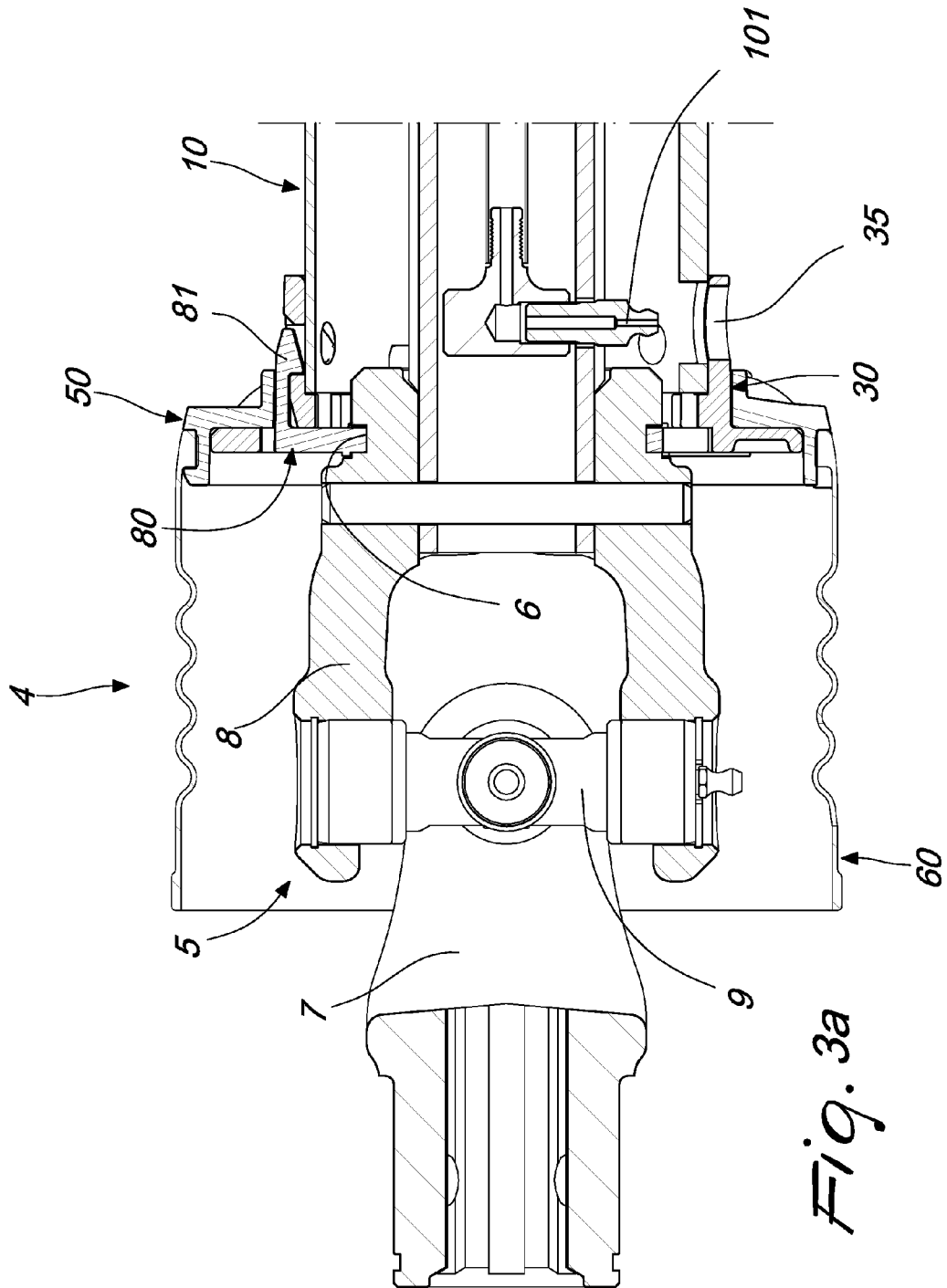

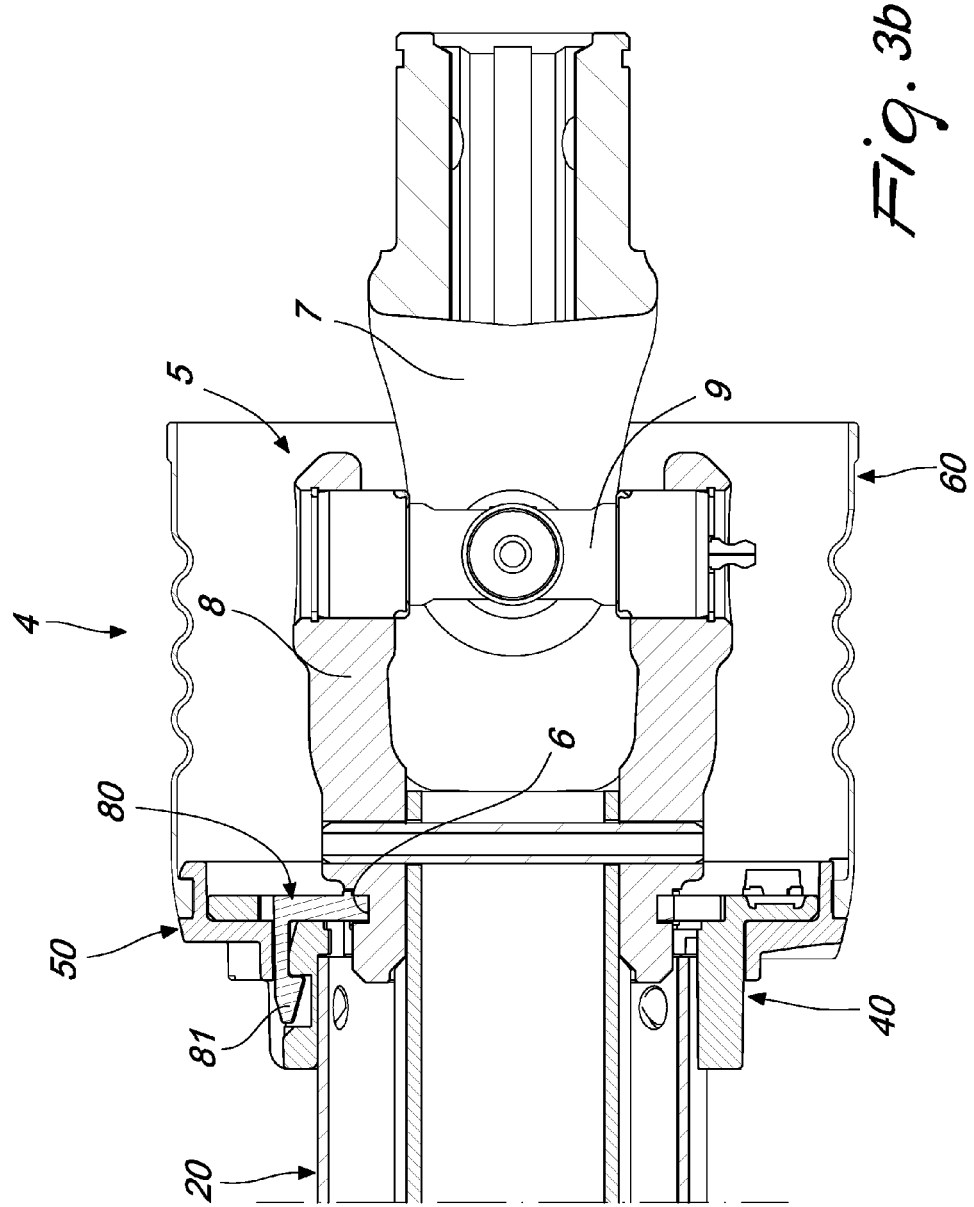

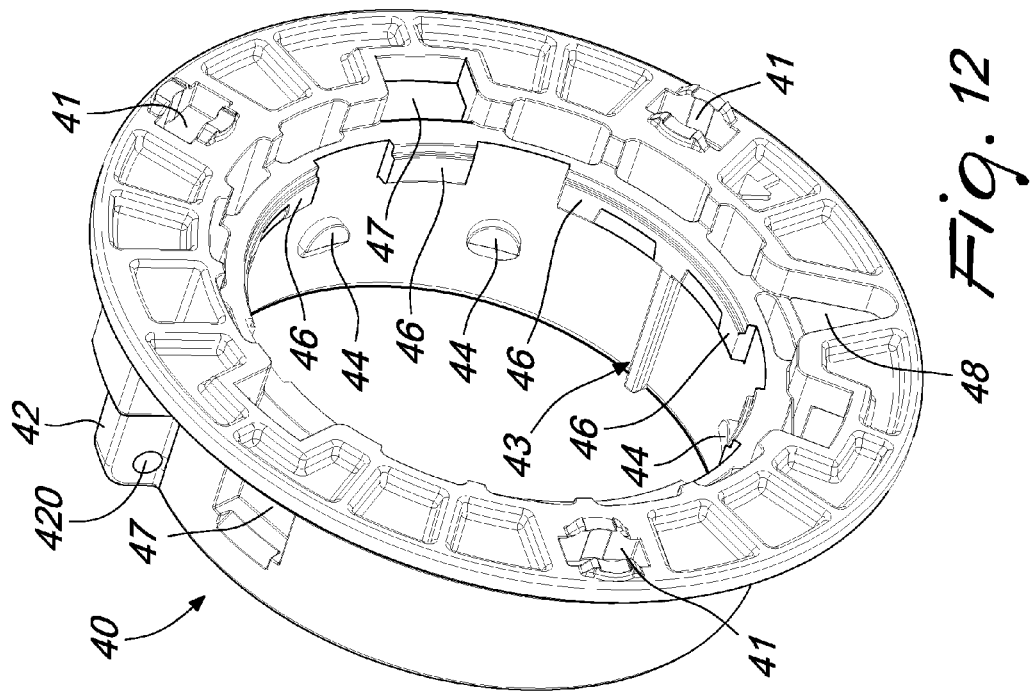
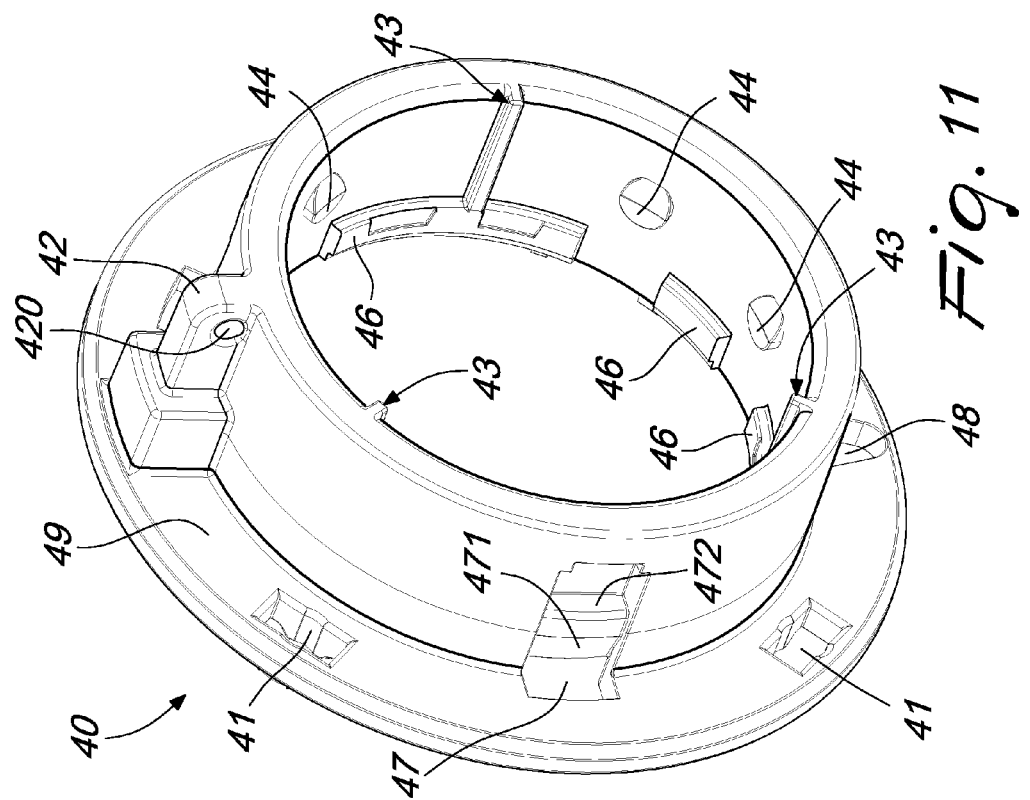

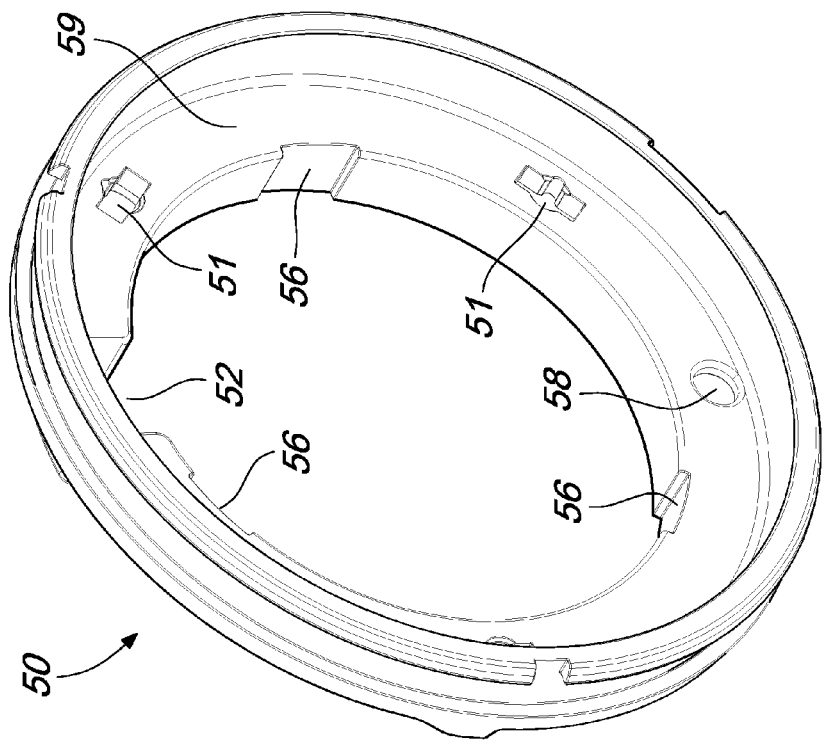
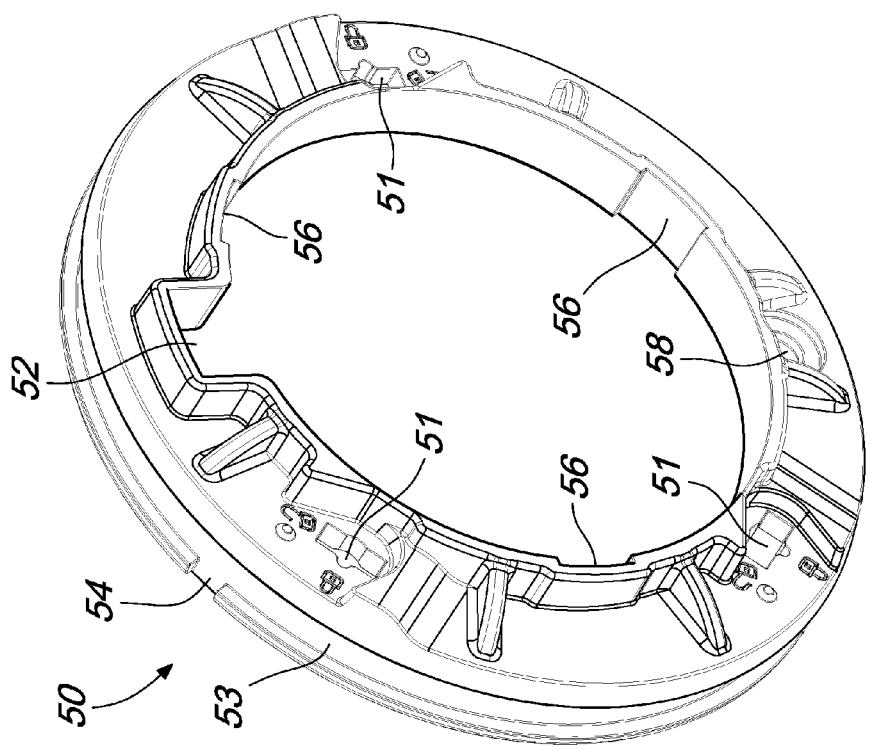

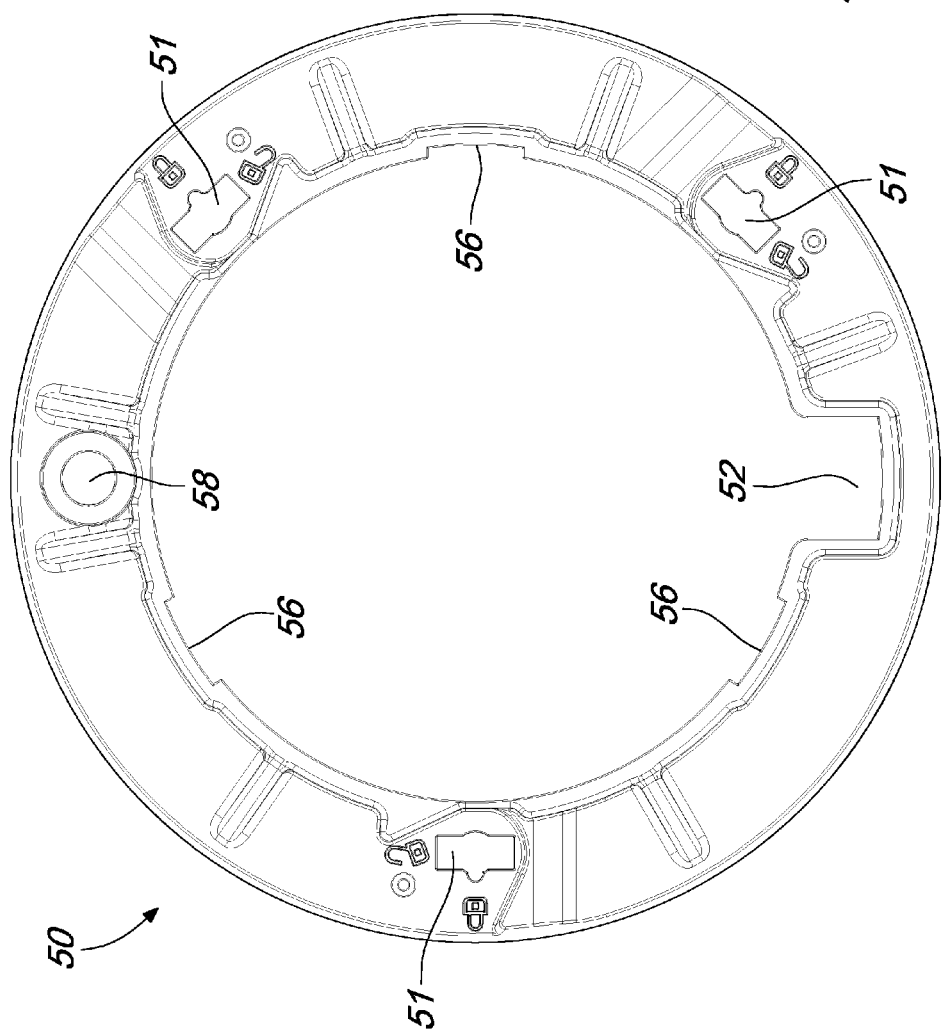

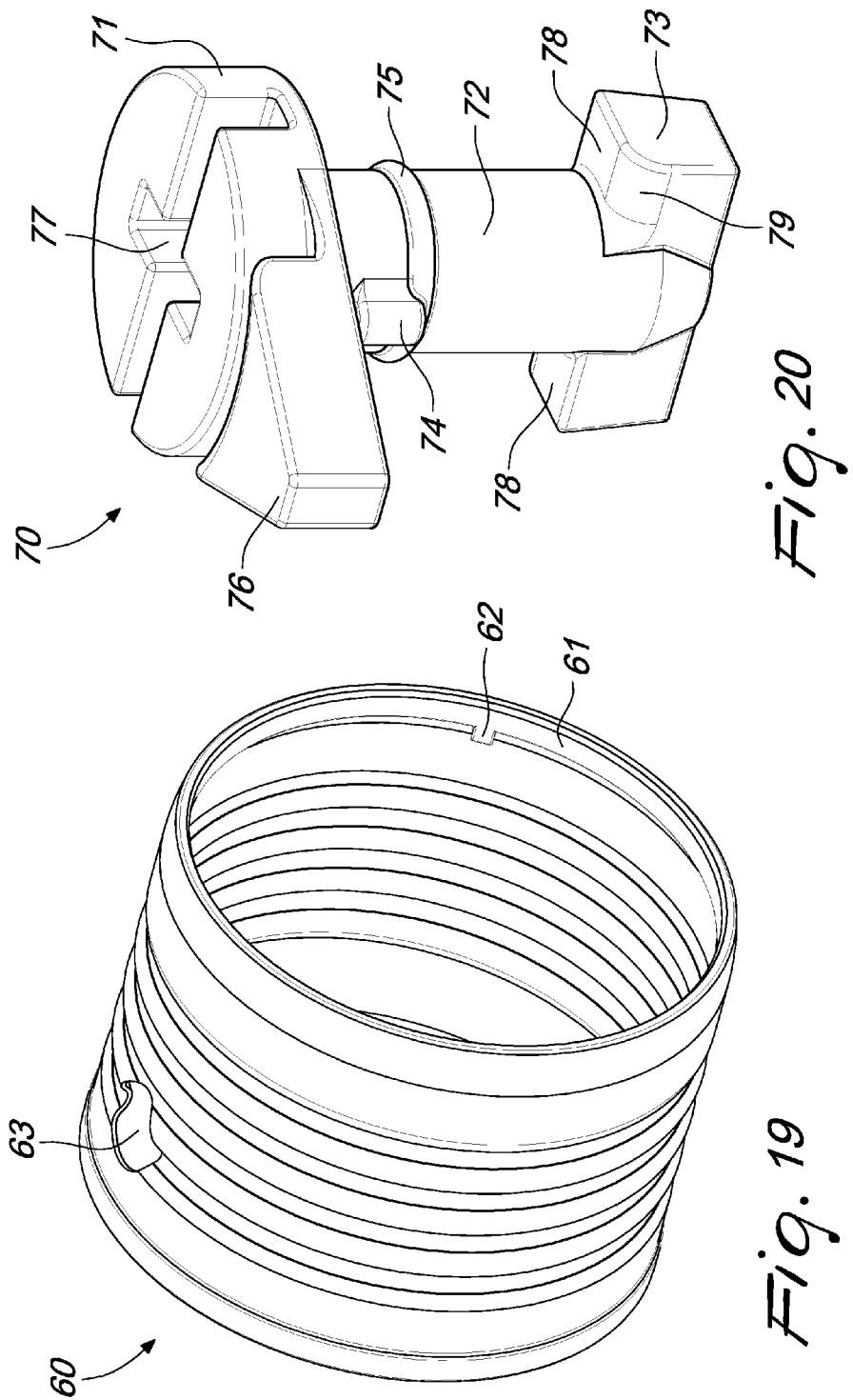

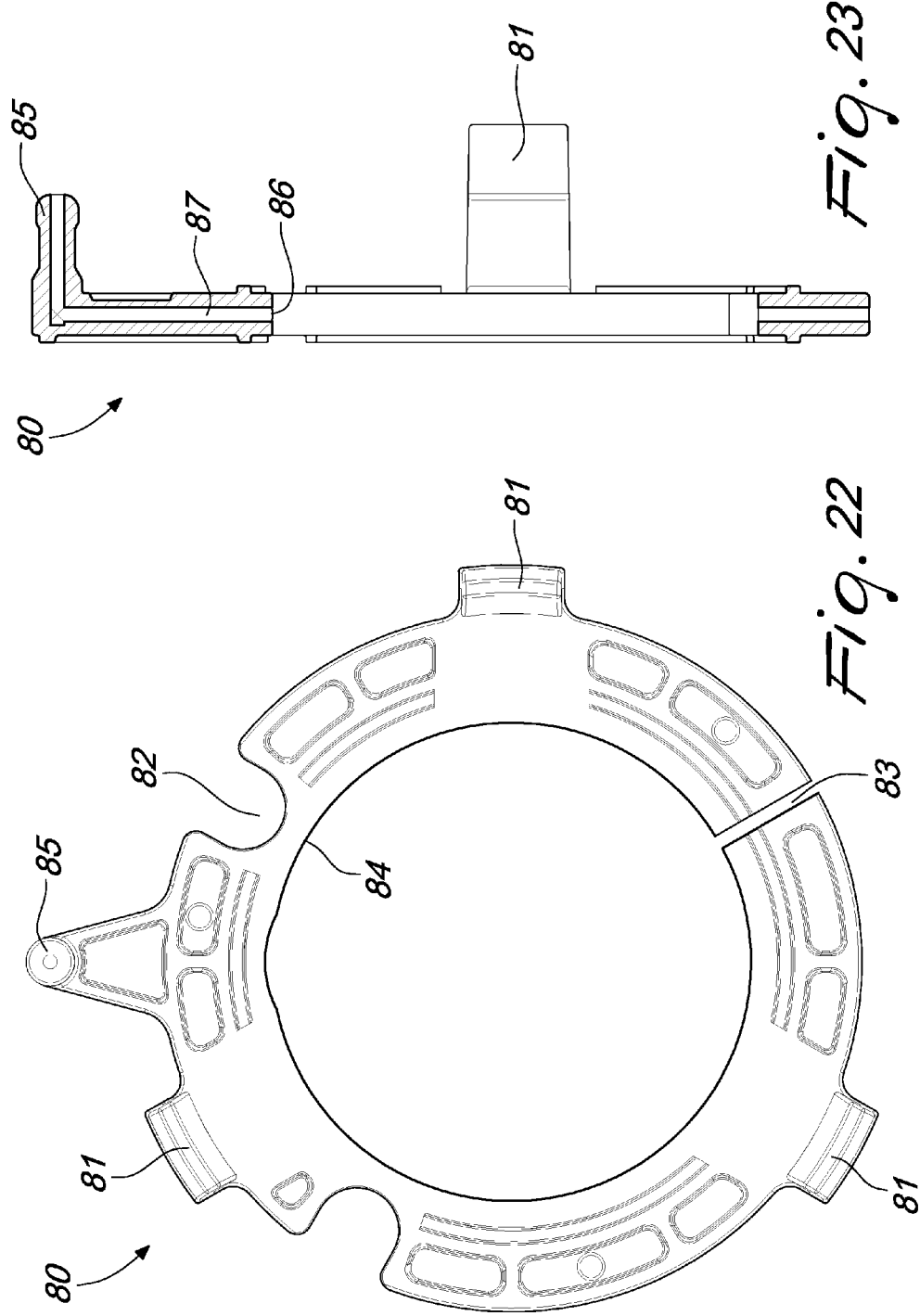

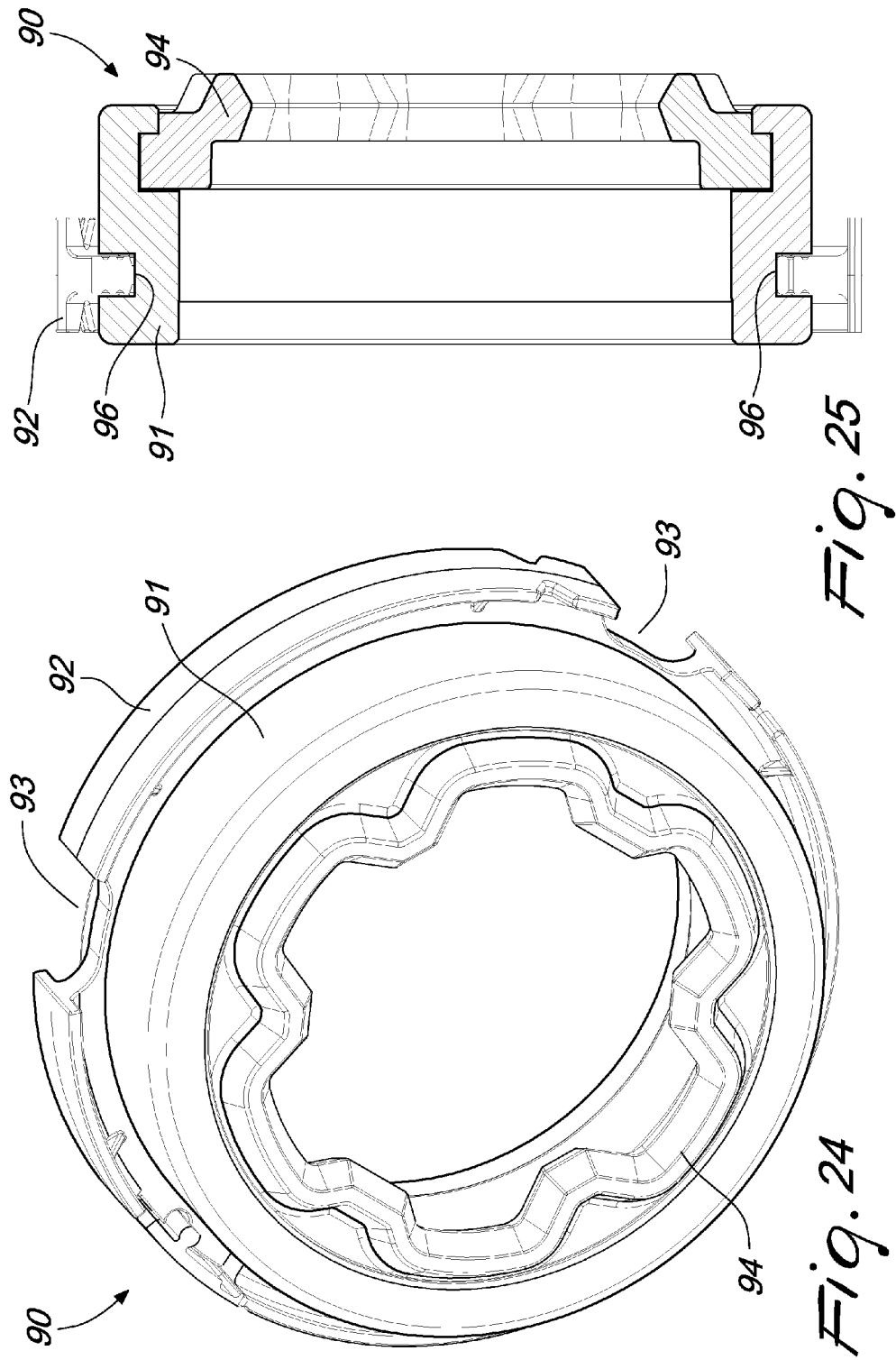

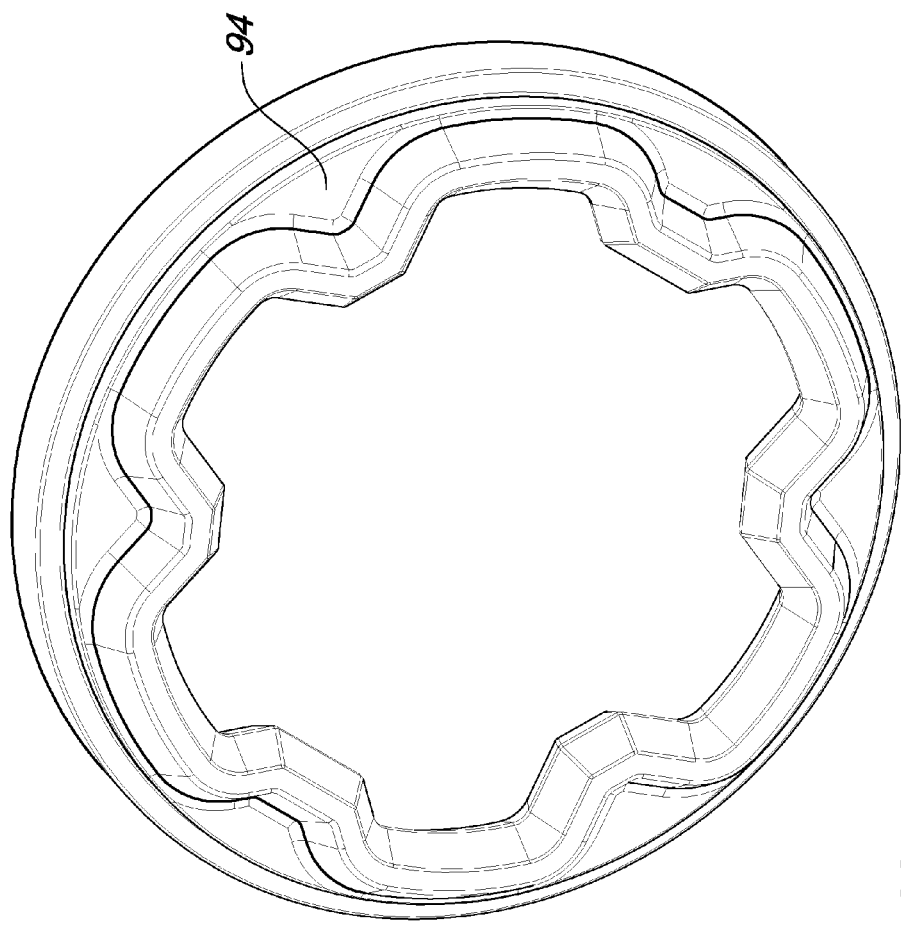
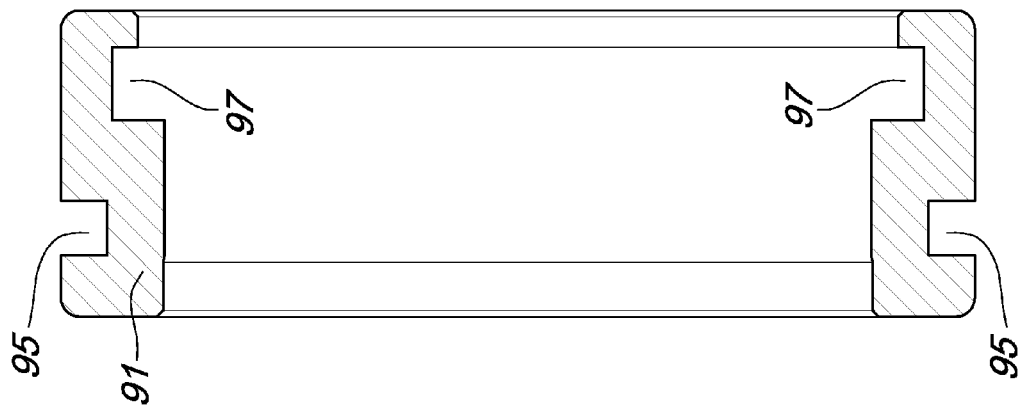
Fig. 29
Fig. 28

PROTECTIVE DEVICE FOR UNIVERSAL JOINT TRANSMISSIONS

CROSS-REFERENCE TO RELATED APPLICATIONS

This application claims priority to Italian Patent Application No. MO2013A000219 filed on Jul. 31, 2013, the disclosure of which is hereby incorporated in its entirety by reference herein.

TECHNICAL FIELD

The present invention relates to a protective device for universal joint transmissions.

BACKGROUND

A universal joint transmission is usually formed by at least two telescopic transmission shafts, at the ends of which articulated joints are mounted which are capable of transmitting the motion and the torque to elements that rotate about oblique axes and on different planes. Such transmissions are widespread in the agricultural field, for example in order to connect equipment to the power take-off of the tractor. In order to meet the conformity and safety requirements, universal joint transmissions must be provided with suitable protections that isolate the rotating elements from the external environment and at the same time do not limit the articulation and the moving mechanisms of the system.

In general, the protection is an integral part of a universal joint transmission and is formed by two flexible protections arranged at the end of two telescopic and concentric tubular protections capable of following the relative movements among the elements of a universal joint transmission.

Currently, there are several types of protection on the market, which, however, are not devoid of drawbacks. Among the drawbacks one must certainly include the fact that they make the assembly and disassembly of the universal joint on/from the power take-off very laborious. Furthermore, the protections of the known type make it difficult to maintain the universal joint transmission, for example by preventing direct access to the parts to be lubricated of the universal joint transmission.

In protections of the known type, the flexible hoods that protect the joints are fixed, for example, by means of pairs of flanges, to the tubular elements that protect the transmission shafts, and are supported by supporting rings, each of which slides in a slot provided in the fork of the joint. However, said components are coupled to each other, for example by means of screws, and access to the joint, for assembling and disassembling the universal joint transmission, is therefore very laborious for the operator.

In other protective solutions of the known type, the flexible hoods that protect the joints can be fixed to the tubular elements, that protect the transmission shafts, by means of supporting rings or pairs of flanges fixed on the tubular protective elements by way of snap action engagement means. In these cases, however, the operator, in order to be able to disengage the hood and access the joint, must act simultaneously on all the snap action engagement points by means of tools, and this occupies simultaneously both hands and is particularly awkward. Furthermore, since reengagement occurs by repositioning the hood and reengaging the snap action means until interlocking has occurred, a partial reengagement of the snap action means can lead the operator to think that the hood is fixed correctly, when this condition actually is not occurring.

SUMMARY

The aim of the present invention is to provide a protective device for universal joint transmissions that obviates the drawbacks and overcomes the limitations of the background art, by devising a complete protection for universal joint transmissions that simplifies the steps of assembly and maintenance of said protection, ensures easier and faster mounting of the universal joint on power take-offs, simpler maintenance, thanks to direct access to the parts to be lubricated, and limits to a single end the need to constrain to the rotation of the telescopic protections.

A further object of the invention is to provide a protective device that is capable of giving the greatest assurances of reliability and safety in use.

Another object of the invention is to provide a protective device that is easy to provide and is economically competitive if compared with the background art.

This aim and these and other objects that will become better apparent hereinafter are achieved by a protective device for universal joint transmissions, comprising at least two coaxial tubular protective elements, which are associated telescopically with each other and are adapted to accommodate the telescopic shafts of a universal joint transmission, said two tubular protective elements each comprising, at their opposite ends, a protective hood, adapted to surround a joint of said universal joint transmission, characterized in that said two tubular protective elements each comprise a locator flange associated rigidly with said tubular protective element and in that said protective hood comprises:

a coupling flange, which is coaxial to said locator flange and is adapted to abut against said locator flange, a cylindrical accordion portion supported by said coupling flange, and at least one fastening element adapted to fasten said coupling flange on said locator flange, there being also at least one supporting ring, which comprises engagement means for the engagement of said supporting ring with said locator flange, said supporting ring being accommodatable rotatably in an annular seat provided at the outer surface of said joint in order to support said protective device.

BRIEF DESCRIPTION OF THE DRAWINGS

Further characteristics and advantages of the present invention will become better apparent from the description of a preferred but not exclusive embodiment of a protective device for universal joint transmissions, illustrated by way of non-limiting example with the aid of the accompanying drawings, wherein:

FIG. 2 is an exploded perspective view of the protective device, according to the invention;

FIG. 2a is a detailed assembled perspective view of a portion of the protective device of FIG. 2 showing the coupling flange fastened to the locator flange by the fastening element;

FIG. 3a is a detailed sectional side of the view of a portion of the device shown in of FIG. 3;

FIG. 3b is a detailed sectional side of the view of another portion of the device shown in of FIG. 3;

FIG. 11 is a front perspective view of a second locator flange of the protective device, according to the invention;

FIG. 12 is a rear perspective view of the locator flange of FIG. 11;

FIG. 14 is a front perspective view of a coupling flange of the protective device, according to the invention;

FIG. 15 is a rear perspective view of the coupling flange of FIG. 14;

FIG. 16 is a front view of the coupling flange of FIG. 14;

FIG. 19 is a front perspective view of a cylindrical accordion portion of the protective device, according to the invention;

FIG. 20 is a perspective view of a fastening element of the protective device, according to the invention;

FIG. 22 is a front view of the supporting ring of FIG. 21;

FIG. 23 is a sectional side view of the supporting ring of FIG. 21;

FIG. 24 is a front perspective view of a supporting bush of the protective device, according to the invention;

FIG. 25 is a sectional side view of the supporting bush of FIG. 24;

FIG. 28 is a sectional side view of the annular element of FIG. 27;

FIG. 29 is a front perspective view of an annular gasket comprised within the supporting bush of FIG. 24.

DETAILED DESCRIPTION

Figure 1:
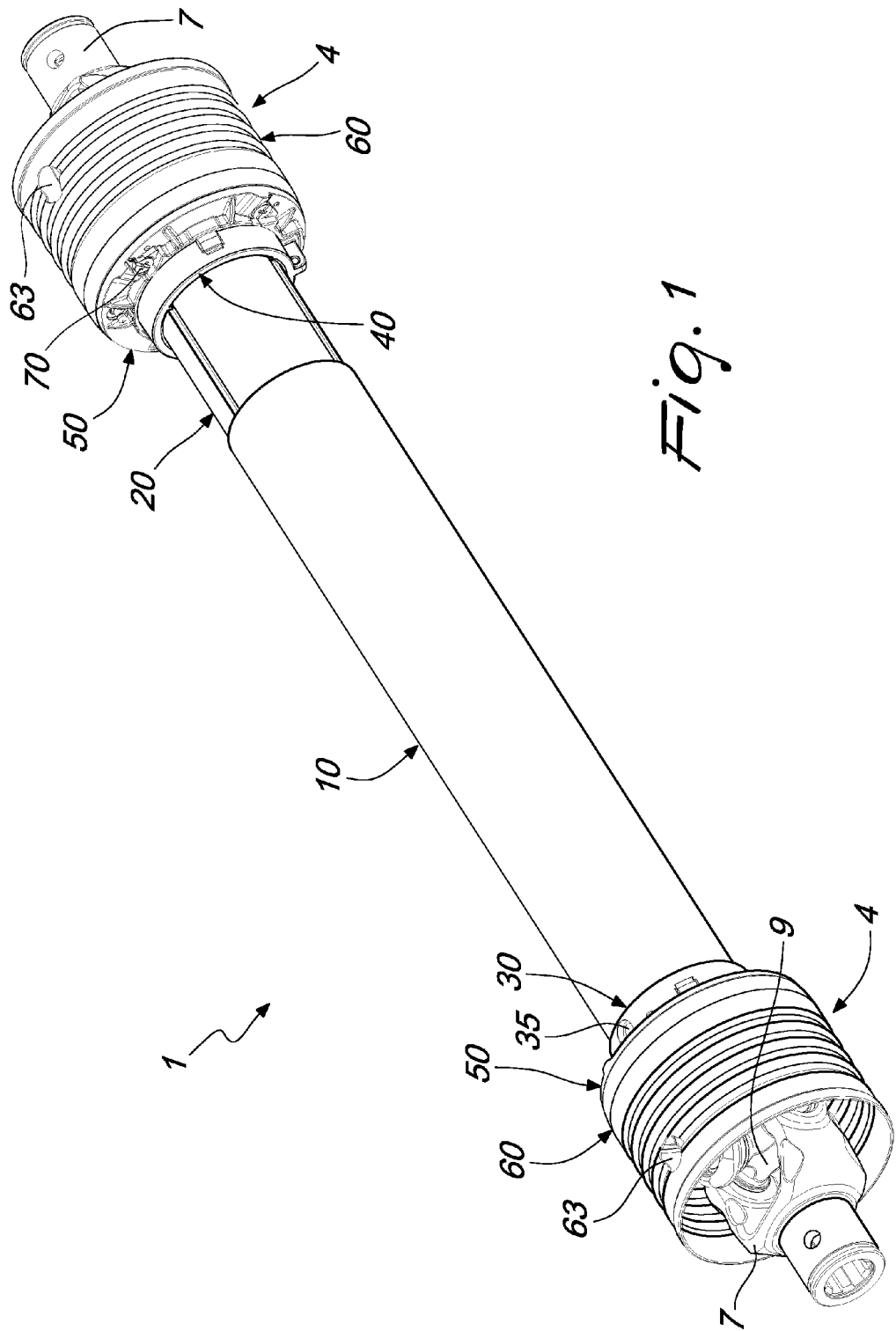
FIG. 1 is a perspective view of a protective device, according to the invention, applied to a universal joint transmission.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A universal joint transmission is composed of two universal articulations 5, or joints, coupled to the free ends of two telescopic tubular transmission shafts 2 and 3, the cross-section geometries of which are such as to prevent their mutual rotation but to allow their mutual sliding along their own axis. The universal joints 5 are composed generically of two forks 7 and 8 mutually connected by means of a cross piece 9, capable of transmitting the rotation on concurrent axes. The forks 8 of two opposite joints 5 are equal in their functions, but vary in the geometry of the slotted profile that allows their coupling with the respective transmission shaft 2 or 3. The mounting of the universal joint transmission on a generic power take-off occurs by means of suitable slotted receptacles provided on the forks 7.

With reference to the figures, the protective device for universal joint transmissions, generally designated by the reference numeral 1, comprises at least two coaxial tubular protective elements 10, 20, which are associated telescopically with each other and are adapted to accommodate the telescopic shafts 2, 3 of a universal joint transmission. The tubular protective elements 10, 20 each comprise, at their opposite ends, a protective hood 4, adapted to surround a joint 5 of the universal joint transmission.

According to the invention, the two tubular protective elements 10, 20 each comprise a locator flange 30, 40 associated rigidly with the tubular protective element 10, 20. The protective hood 4 comprises a coupling flange 50, which is coaxial to the locator flange 30, 40 and is adapted to abut against the locator flange 30, 40, and a cylindrical accordion portion 60 supported by the coupling flange 50. Furthermore, according to the invention, the protective hood 4 comprises at least one fastening element 70, shown assembled in broken lines in FIG. 2a adapted to fasten the coupling flange 50 on the locator flange 30, 40. A supporting ring 80 comprises engagement means 81 for engagement with the locator flange 30, 40. The supporting ring 80 can be accommodated rotatably in an annular seat 6 provided at the outer surface of the hub of the fork 8 of the joint 5, in order to support the protective device 1.

Advantageously, the two coaxial tubular protective elements 10, 20, associated telescopically with each other, comprise means 11, 21 for preventing mutual rotation. The tubular protective elements 10, 20 are mutually concentric and allow the internal transmission shafts 2 and 3 to extend and follow the relative movements between the connected machines. The outermost tubular protective element 10 has, as means for preventing mutual rotation, longitudinal teeth 11, which protrude radially inwardly and slide in respective channels 21 provided on the outer surface of the internal tubular element 20. This shape mating is allowed in a single configuration by way of the different angles with respect to the longitudinal axis between the longitudinal teeth 11 and therefore between the channels 21 of the tubular protective elements 10, 20. In this manner, the tubular protective elements 10, 20 are constrained to mutual rotation and can be assembled in an unambiguous manner.

During the operation of the universal joint transmission, the internal rotating elements, and particularly the forks 8 on the annular seat 6 of which the supporting rings 80 slide, tend to rotate the entire protective device 1, due to the friction forces generated in the contact between the annular seat 6 of the fork 8 and the supporting ring 80. In order to ensure the safety of the operator who is nearby, international standards require this rotation to be prevented. By creating a shape constraint between the external tubular protective element 10 and the internal tubular protective element 20 it is sufficient that only one of the two ends is fixed to the fixed external frame, for example the frame of the machine from which the power take-off originates, in order to prevent the rotation of the entire protective device 1.

The protective device 1 can comprise at least one fastening element 70, which is defined by a head 71, a stem 72 and a foot 73. Advantageously, a plurality of fastening elements 70 is present. The stem 72 passes through a first hole 51 provided in the coupling flange 50 and a second hole 31, 41 provided in the locator flange 30, 40. The head 71 is adapted to abut against the coupling flange 50, while the foot 73 is adapted to abut against the locator flange 30, 40. In particular, the fastening element 70 is associated advantageously with the coupling flange 50. In fact, the hole 51 provided in the coupling flange 50 has, advantageously, such a cross-section as to prevent the extraction of the fastening element 70. The rotation of the fastening element 70 about its own longitudinal axis causes the fastening of the coupling flange 50 on the locator flange 30, 40.

The locator flange 30, 40 can comprise a radially protruding portion 32, 42 adapted to engage in a corresponding radial recess 52 provided in the coupling flange 50, for the coupling of the locator flange 30, 40 with the coupling flange 50 in an unambiguous mutual position.

The radially protruding portion 32, 42 can have a hole 320, 420 advantageously used to couple, by means of a chain, the entire protective device 1 to a fixed external frame.

The coupling flange 50 can comprise an annular recess 53 adapted to engage an edge 61 of the cylindrical accordion portion 60, which protrudes radially toward the inside of the cylindrical accordion portion 60. Furthermore, the coupling flange 50 can comprise at least one longitudinal notch 54 adapted to accommodate at least one protrusion 62 provided in the cylindrical accordion portion 60 at the protruding edge 61, in order to allow the coupling of the cylindrical accordion portion 60 in an unambiguous mutual position with the coupling flange 50.

The cylindrical accordion portion 60 is made advantageously of a material of the type of rubber and is therefore flexible in order to facilitate its mounting on the coupling flange 50.

The coupling between the protrusion 62 and the longitudinal notch 54 is such to allow a single mounting configuration of the cylindrical accordion portion 60 on the coupling flange 50, and has the purpose of preventing a relative movement between the cylindrical accordion portion 60 and the flange 50, creating a geometric constraint to rotation. The cylindrical accordion portion 60 has furthermore a hole 63 that constitutes a direct access for the lubrication of the cross pieces 9.

The locator flange 30, 40 comprises advantageously also alignment means 33, 43 for the alignment of the locator flange 30, 40 with the corresponding tubular protective element 10, 20.

In addition, the locator flange 30, 40 can comprise circular teeth 34, 44 that protrude radially toward the inside of said flange and are adapted to enter corresponding holes 12, 22 provided in the tubular protective element 10, 20, in order to eliminate any degree of freedom between the locator flanges 30, 40 and the corresponding tubular protective elements 10 and 20.

As is clear from the accompanying figures, the locator flange 30 is associated rigidly with the external tubular protective element 10, while the locator flange 40 is associated rigidly with the internal tubular protective element 20. The locator flanges 30 and 40 are equivalent in their functions and are geometrically similar. Their differences are:

the inside diameter, which is different in order to allow respectively the mounting of the locator flange 40 on the tubular protective element 20, and of the locator flange 30 on the tubular protective element 10;

the alignment means 33 and 43 of the locator flanges 30 and 40 with the respective tubular protective elements 10 and 20; in the case of the locator flange 30, the alignment means 33 are constituted by a plurality of pairs of locator fins for the longitudinal teeth 11 of the tubular element 10, while in the case of the locator flange 40 the alignment means 43 are constituted by a plurality of longitudinal protrusions for engagement with the channels 21 of the tubular element 20;

the presence of a hole 35 for accessing the oiler, in the locator flange 30 only.

The mounting of the locator flange 30 on the tubular protective element 10 is possible in a single configuration, because, for angles other than the only one allowed for assembly, the locator fins 33 prevent the insertion and sliding of the longitudinal teeth 11 inside the tubular element 10. The tubular protective element 10 has furthermore a hole 13 at which the hole 35 of the flange 30 aligns itself and which is assigned to the lubrication of the transmission shafts 2 and 3 by means of the channel 100 connected to the nozzle 101.

The mounting of the locator flange 30, 40 and the placement of the circular teeth 34, 44 at the holes 12, 22 is further facilitated by geometric locators 36, 46 that are used as abutment for the tubular protective elements 10, 20.

Figure 9:
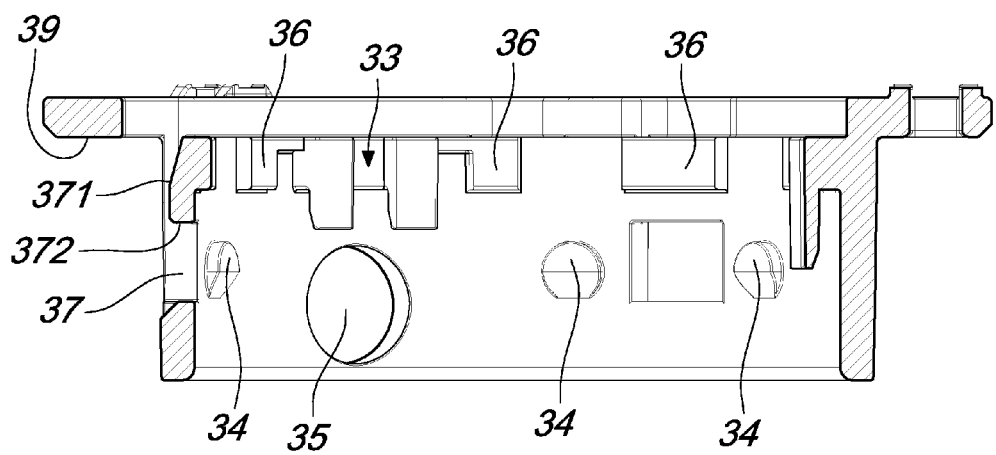
FIG. 9 is a sectional side view of the locator flange of FIG. 6.
Figure 10:
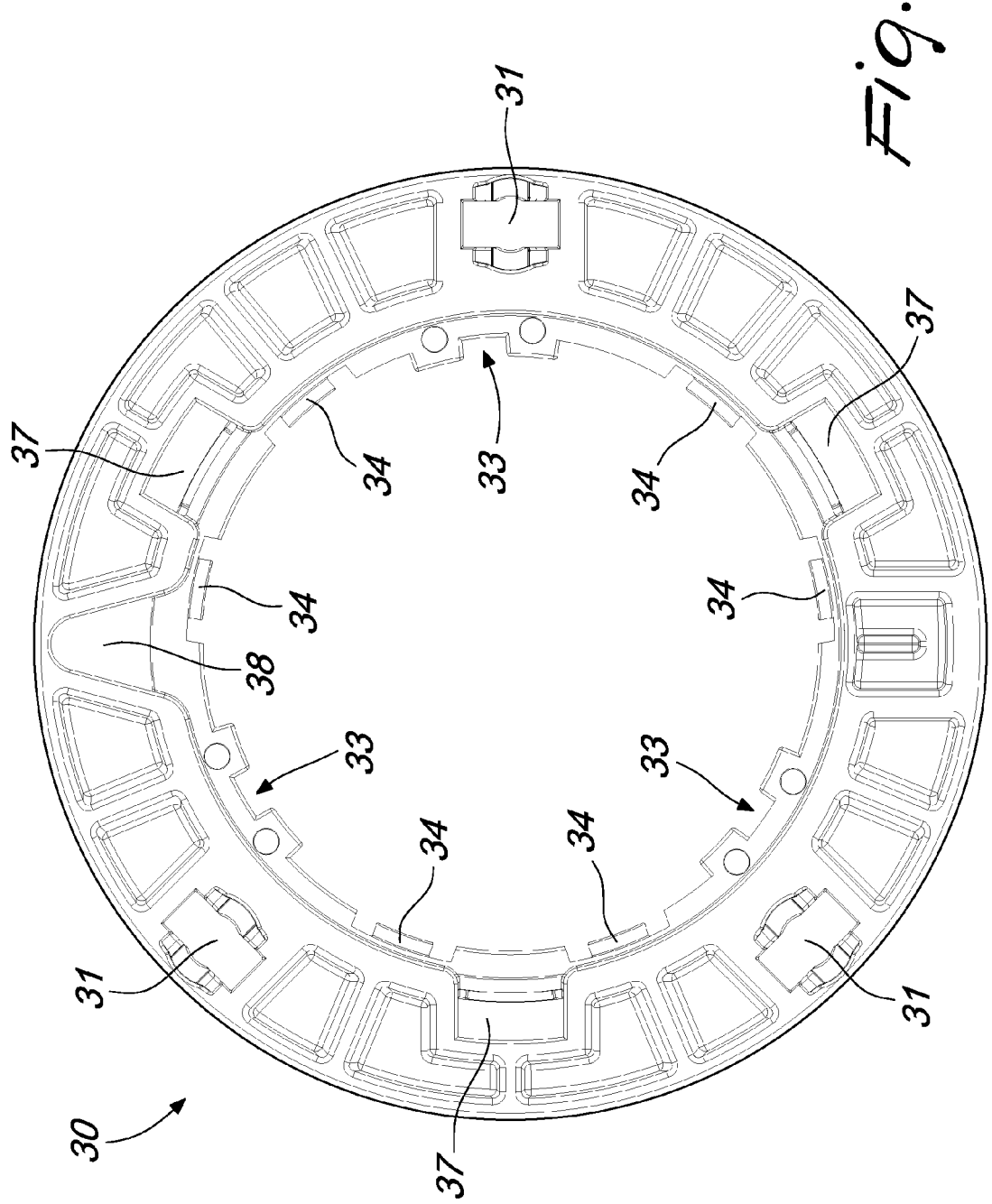
FIG. 10 is a rear view of the locator flange of FIG. 6.
Figure 13:
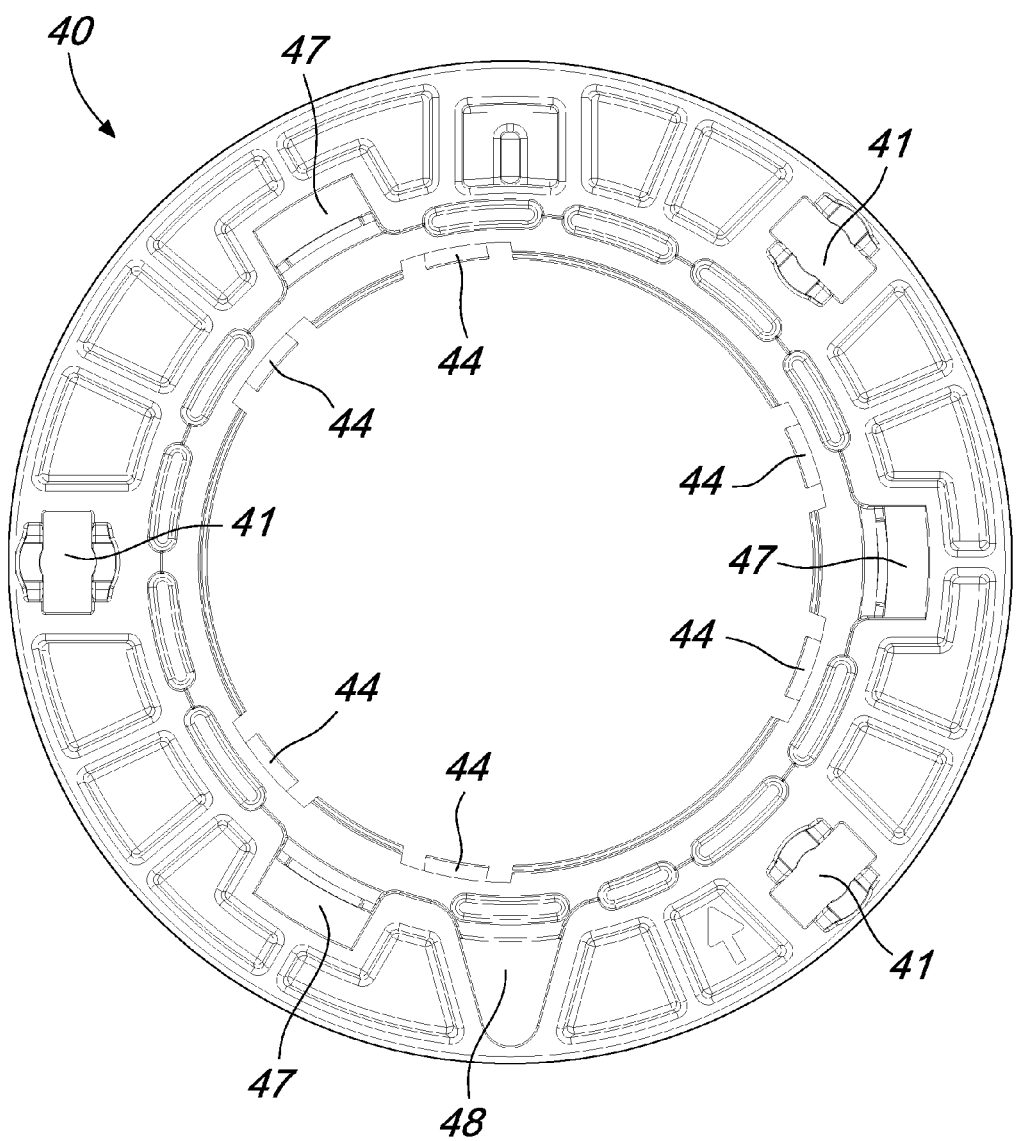
FIG. 13 is a rear view of the locator flange of FIG. 11.
Figure 17:
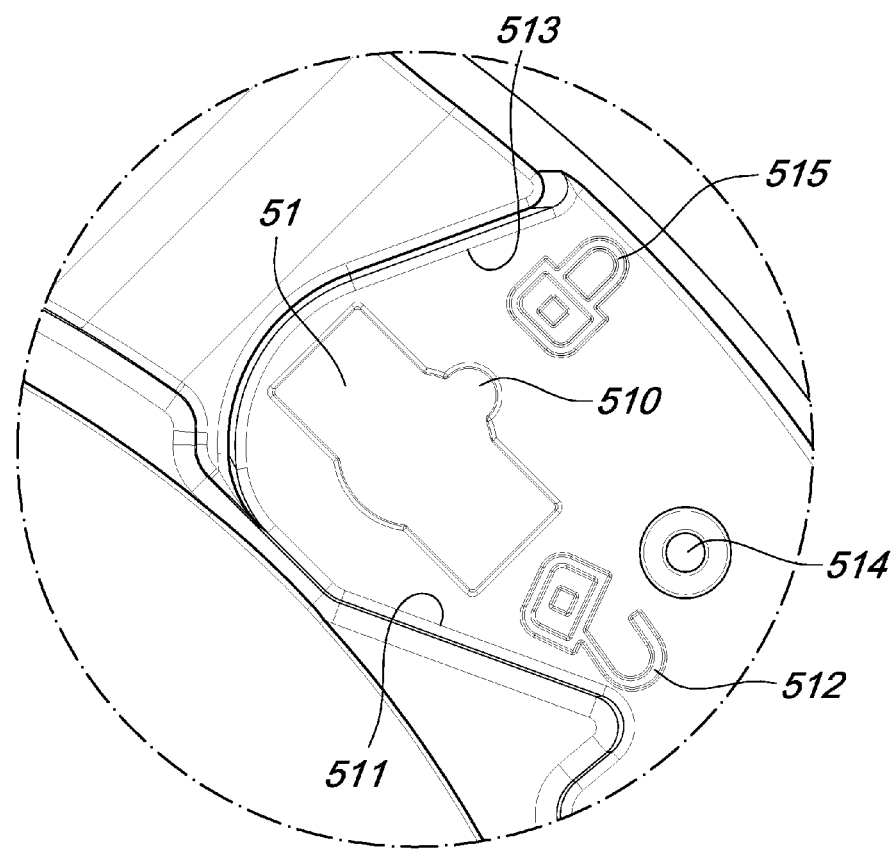
FIG. 17 is an enlarged-scale view of a detail of the coupling flange of FIG. 16.
Figure 18:
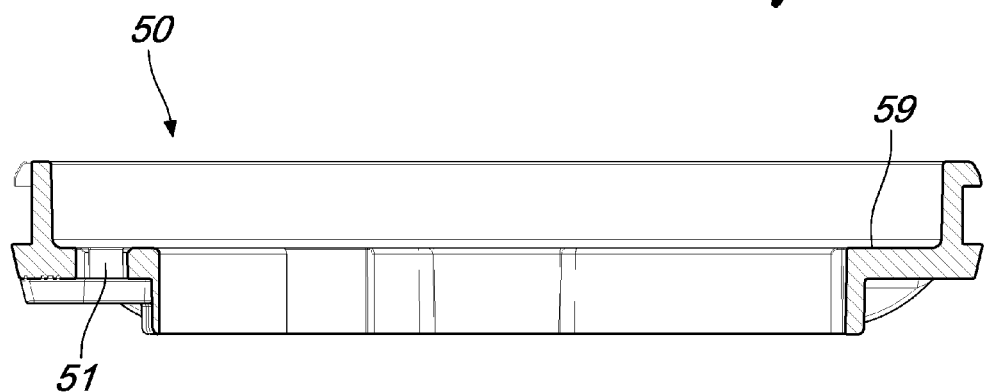
FIG. 18 is a sectional side view of the coupling flange of FIG. 14.
Figure 21:
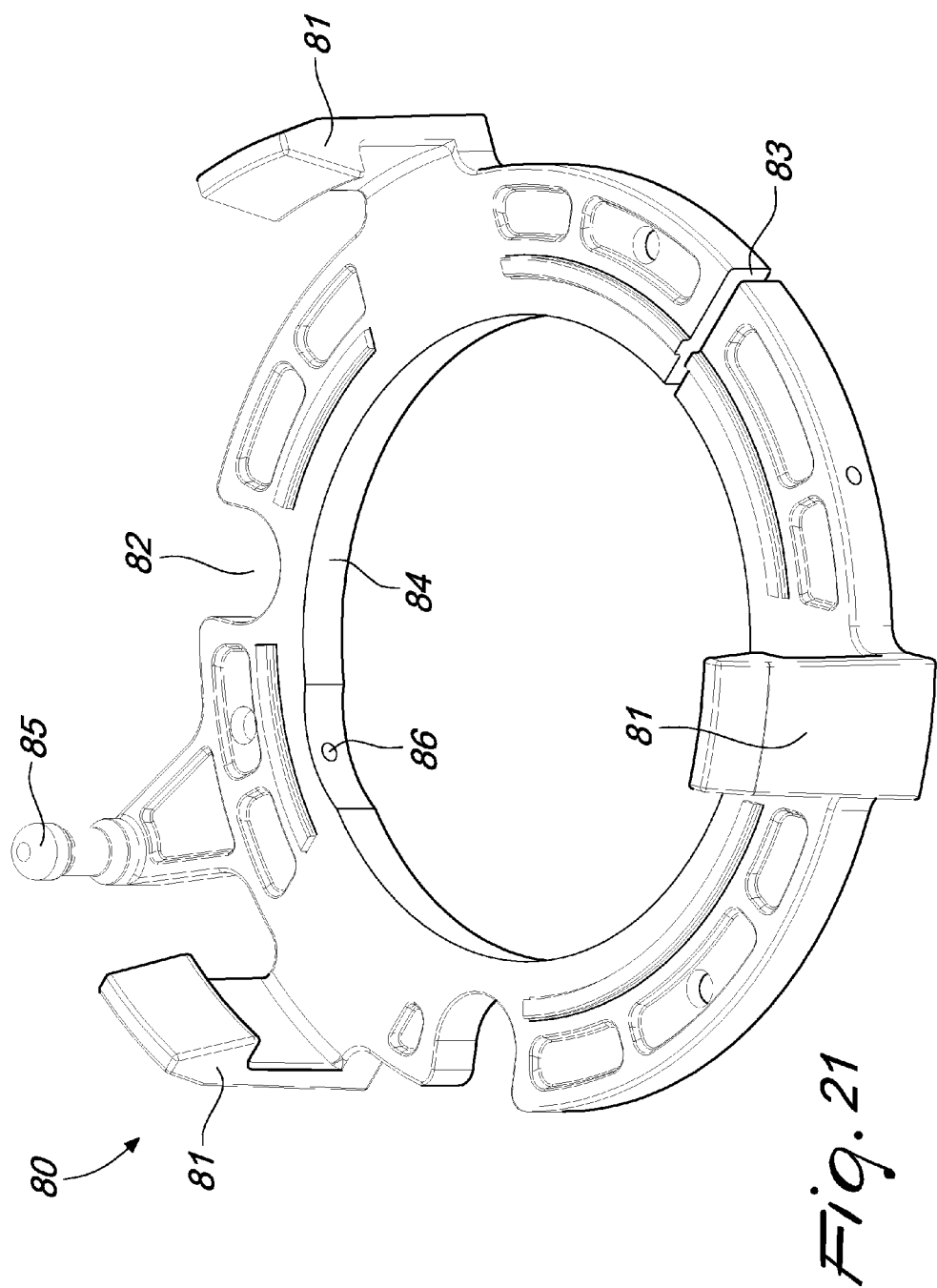
FIG. 21 is a front perspective view of a supporting ring of the protective device, according to the invention.
Figure 27:
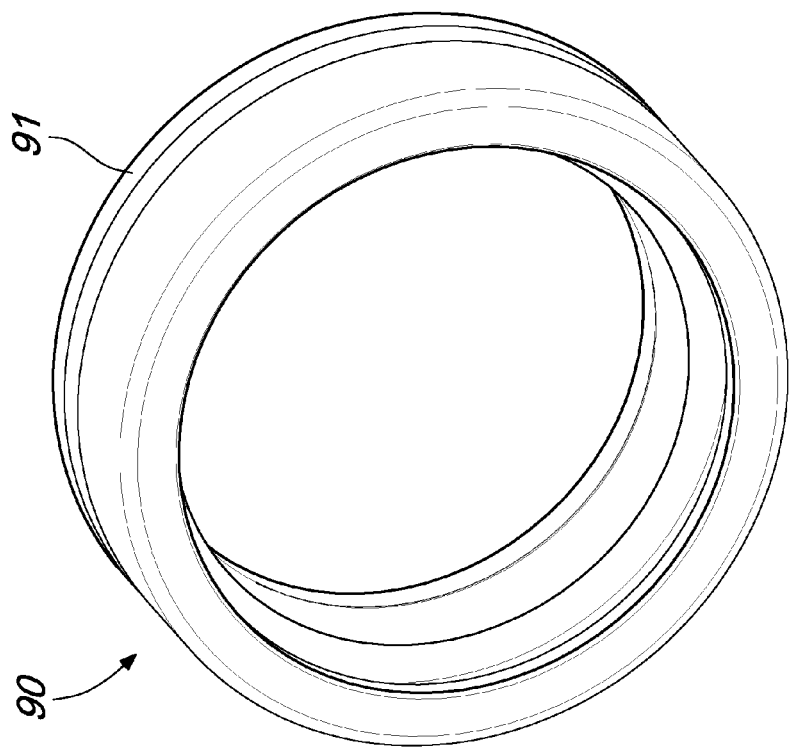
FIG. 27 is a front perspective view of a second annular element comprised in the supporting bush of FIG. 24.
Figure 26:
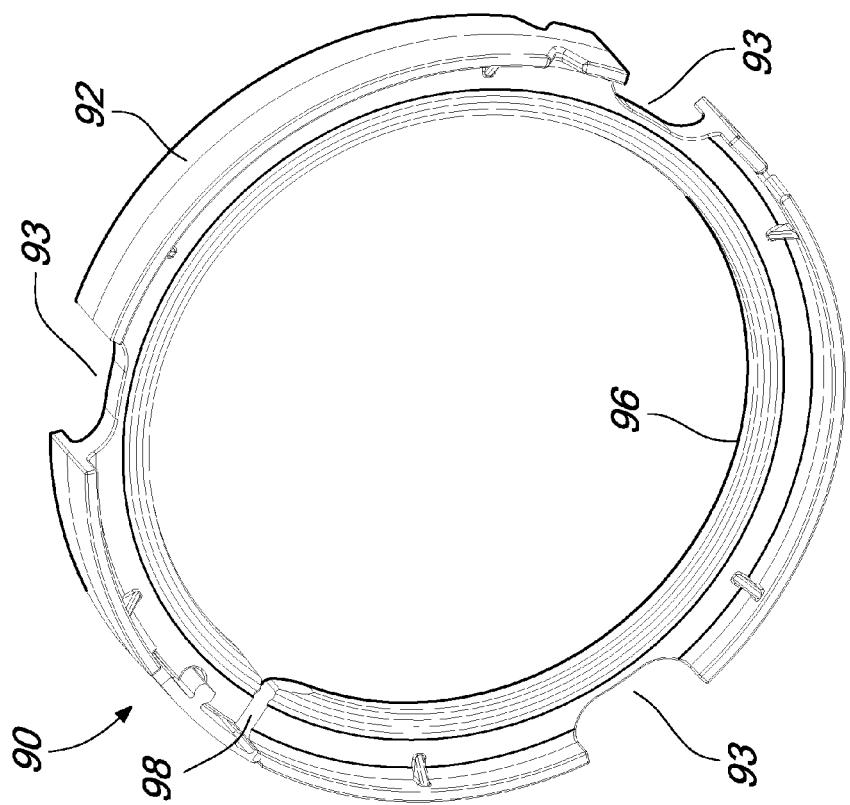
FIG. 26 is a front perspective view of a first annular element comprised in the supporting bush of FIG. 24.

The locator flange 30, 40 has a plurality of receptacles 37, 47 for the engagement means 81 of the supporting ring 80, which are advantageously constituted by hook-shaped teeth. In particular, as shown particularly in the sectional side view of FIG. 9 related to the locator flange 30, the receptacles 37, 47 have an inclined surface 371, 471 and an abutment 372, 472, which, by replicating the shape of the tooth that constitutes the engagement means 81 of the supporting ring 80, facilitate the engagement and prevent the disassembly of the supporting ring 80 unless a tool is used.

Figure 3:
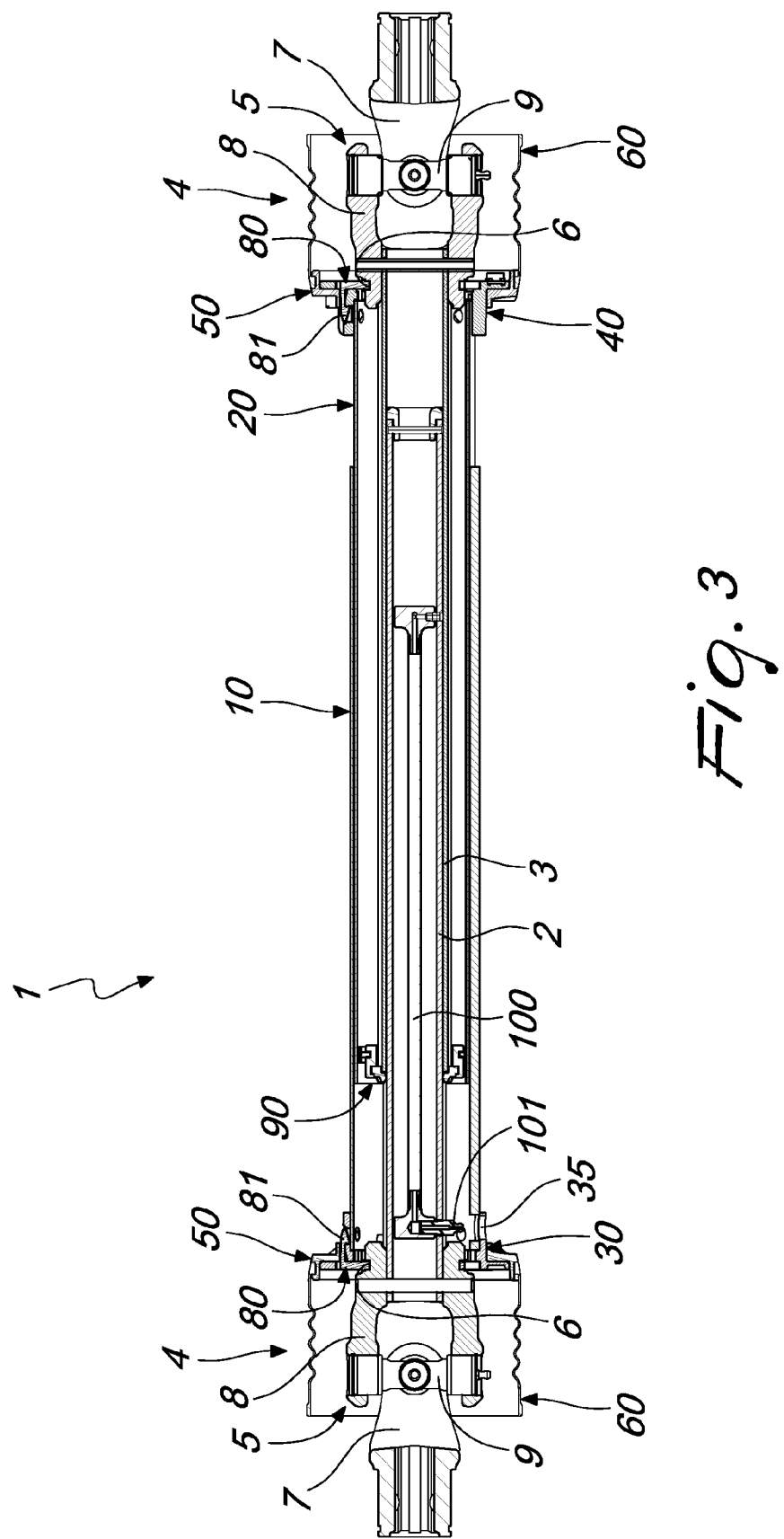
FIG. 3 is a sectional side view of the device of FIG. 1.
Figure 4:
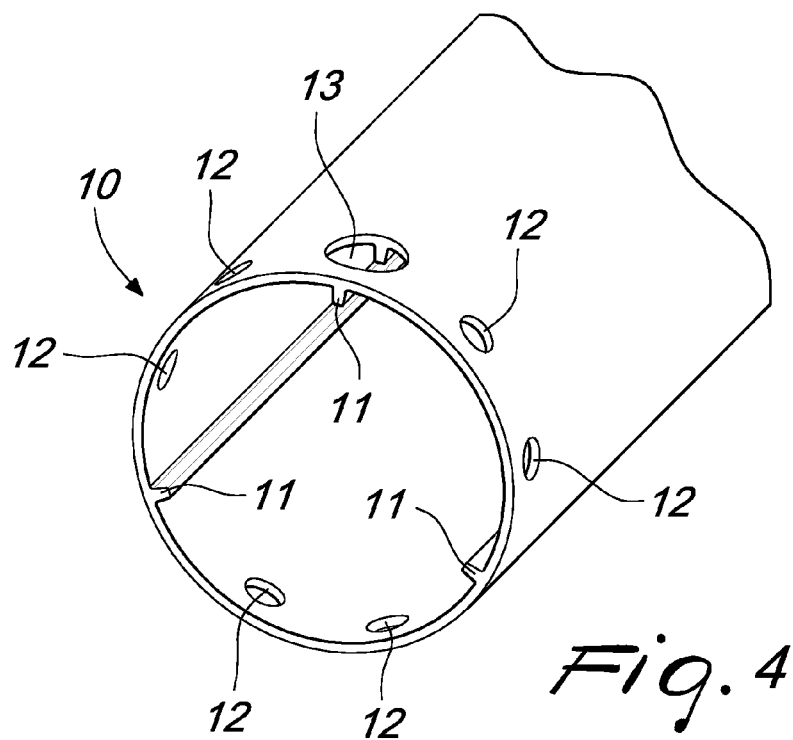
FIG. 4 is a perspective view of one end of a first tubular protective element of the protective device, according to the invention.
Figure 5:
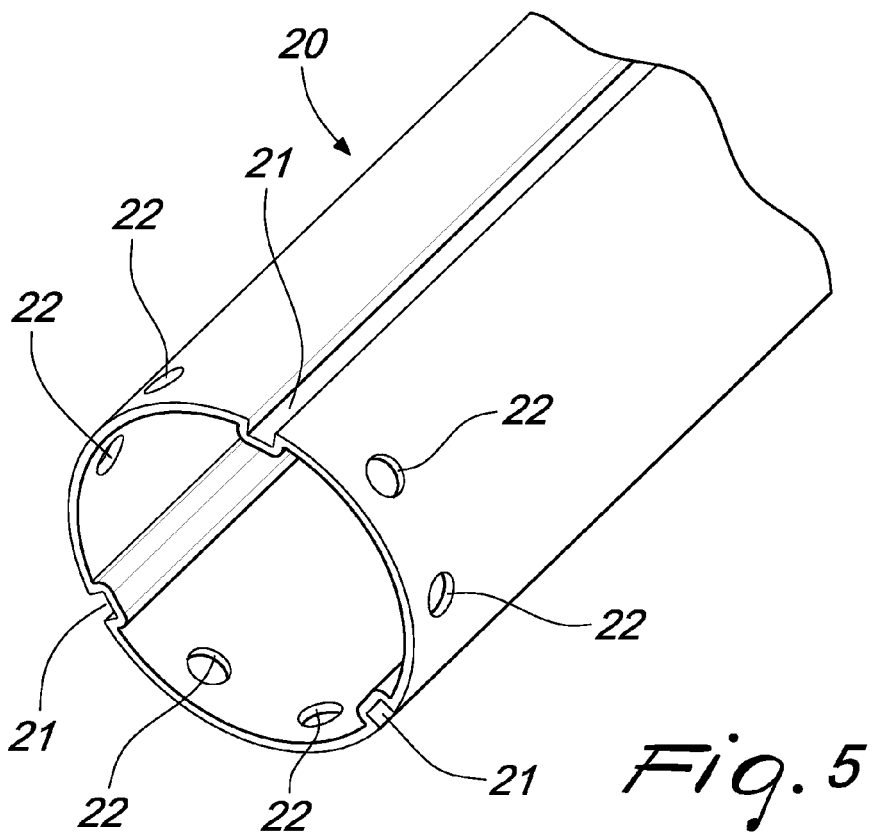
FIG. 5 is a perspective view of one end of a second tubular protective element of the protective device, according to the invention.
Figure 7:
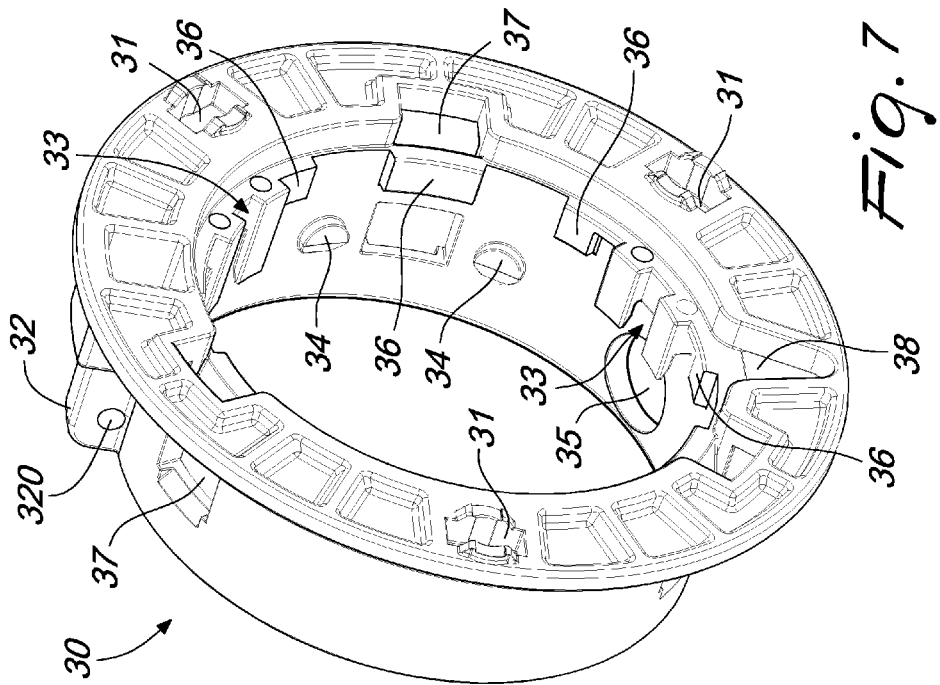
FIG. 7 is a rear perspective view of the locator flange of FIG. 6.
Figure 6:
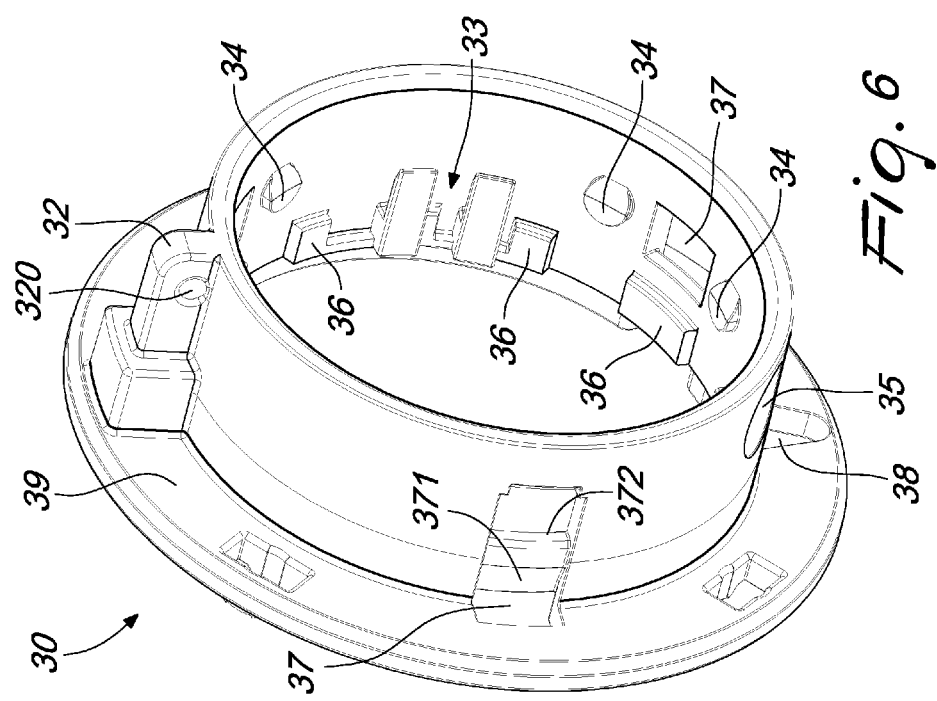
FIG. 6 is a front perspective view of a first locator flange of the protective device, according to the invention.

Advantageously, the supporting ring 80 is constituted by an annular element made of polymeric material and has at least one portion weakened by a hollow 82, and a discontinuity 83, which make such annular element easily deformable in an elastic manner; this characteristic allows to widen the supporting ring 80 and to accommodate it in the recess 6 of the fork 8, as shown by the sectional view of FIG. 3 and in more detail in FIGS. 3a and 3b. When the universal joint transmission rotates, the circumferential surface 84 of the ring 80 slides inside the recess 6 on the fork 8. The circumferential surface 84 is lubricated by means of the grease fitting 85, which is connected to the hole 86 by means of a channel 87 that is internal to the supporting ring 80. Access to the grease fitting 85 is possible also from the outside, with the protective device 1 completely assembled, thanks to the passage 38, 48 provided in the locator flange 30, 40 and to the corresponding passage 58 provided in the coupling flange 50.

The hood 4 can assume a so-called open configuration, when it is free to slide along the tubular protective elements 10, 20, and a so-called closed configuration, when is fixed to the locator flange 30, 40.

In order to pass from the open configuration to the closed configuration, i.e., in order to fix the hood 4 to the locator flange 30, 40, it is necessary to bring the surface 59 of the flange 50 to abut against the surface 39, 49 of the locator flange 30, 40 by aligning the radial recess 52 with the radially protruding portion 32, 42 as well as all the other geometric locators provided to facilitate the alignment among the parts, using then the adapted fastening elements 70, generically defined as buttons, that pass through the holes 51 and 31 (or 41) of the two flanges 50 and 30 (or 40), for the actual fastening. The fastening elements 70 have, as mentioned earlier, a head 71, a stem 72 and a foot 73, which is advantageously T-shaped, and which are essential to the functionality of the fastening element 70. A series of refinements are inserted, and described hereinafter, in order to simplify the assembly and disassembly of the hood 4 by the operator.

The geometry of the holes 51 of the coupling flange 50 allows a single configuration for positioning the fastening elements 70, because a locator recess 510 is added to the rectangular cross-section of the hole 51 and prevents the spontaneous rotation of the fastening element 70 by engagement with the locator protrusion 74 of the stem 72. Furthermore, a protruding collar 75 on the stem 72 of the fastening element 70 limits the risk that it can exit from its seat, keeping it inserted in the coupling flange 50. The fastening element 70 comprises furthermore, at the head 71, a triangular protrusion 76.

In the open configuration, the fastening element 70 is located so that the triangular protrusion 76 is adjacent to a first face 513 of a locator provided on the coupling flange 50 proximate to the hole 51. In this position the fastening element 70 does not apply any longitudinal constraint between the locator flange 30, 40 and the coupling flange 50, and the visible symbol of an open padlock 512 makes the open configuration easy to interpret. The transition to a closed configuration occurs by rotating the fastening element 70 through approximately 90° clockwise until it abuts against a second face 511 of such locator provided on the coupling flange 50 proximate to the hole 51, and the visible symbol of a closed padlock 515 makes the closed configuration easy to interpret. In order to pass from one configuration to the other, the triangular protrusion 76 is such as to deform elastically and pass over a protruding body 514, which is inserted specifically to prevent the transition from closed to open. By applying a rotation by means of a tool, for example a screwdriver, that acts in the cross-shaped notch 77 of the head of the fastening element 70 in order to bring it to the fastening configuration, the surfaces in contact of the locator flange 30, 40 with the coupling flange 50 are compressed one against the other. In fact, the locator flange 30, 40 has a protrusion, shown in FIG. 8, for the sake of simplicity only with reference to the flange 30, which has inclined sides 310 and a flat part 311. When the fastening element 70 is rotated, the surfaces 78 of the foot 73, slide on the inclined sides 310, aided by the connectors 79, and the difference in level generates a traction in the stem 72 of the fastening element 70. In the fastening configuration, in fact, the surfaces 78 of the fastening element 70 are in contact with the flat region 311 of the protrusion of the locator flange 30.

Figure 8:
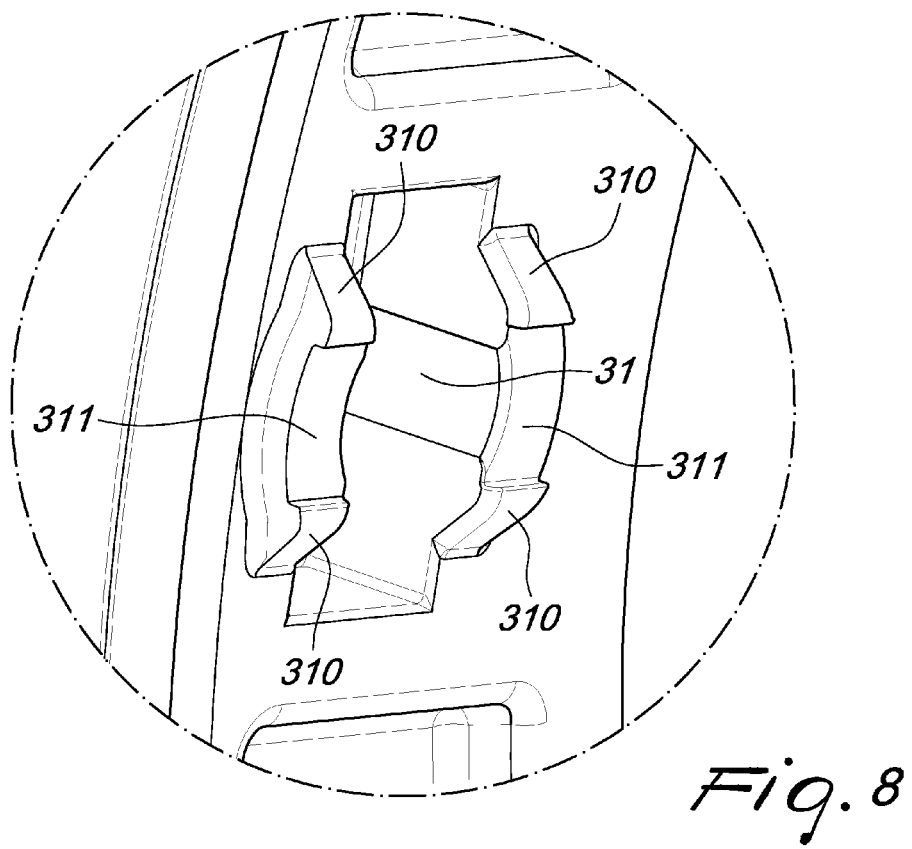
FIG. 8 is an enlarged-scale view of a detail of the locator flange of FIG. 7.

The geometry of the protrusion shown in FIG. 8 has the double function of creating a compression between the locator flange 30, 40 and the coupling flange 50 and of allowing the opening or closing of the fastening element 70 exclusively by acting with a tool.

The operator can therefore access the universal joints by removing the hood 4 by means of the simple rotation of the fastening elements 70.

The supporting ring 80 can be disassembled by using a tool as a lever on each one of the teeth 81. Disassembly, however, is allowed only when the hood 4 is retracted; in fact the coupling flange 50, which is part of the hood 4, has notches 56 that function as a locator for the outer radial surface of the teeth 81 of the supporting ring 80 and prevent the disassembly thereof, despite using a tool.

Safety standards for universal joint transmissions require that in the presence of external loads on the tubular protective elements 10, 20 such elements are not damaged. In fact, the tubular protective elements 10, 20, under the action of external loads in a radial direction, can bend until they make contact, particularly with the longitudinal teeth 11, or with the internal part of the channels 21, with the characteristic grooves of the transmission shafts 2 and 3, causing impacts and potential damage to the protective device 1.

In this regard, the protective device 1 can comprise a supporting bush 90 that is interposed between the tubular protective elements 10, 20 and the telescopic transmission shafts 2, 3 and is adapted to avoid the flexing of the protective tubes 10, 20 for contrasting the action of external loads in a radial direction.

In particular, the supporting bush 90 comprises an internal annular element 91, which rotates integrally with the transmission shaft 3, and an external annular element 92, which rotates integrally with the tubular protective element 20. The external annular element 92 comprises radial notches 93 adapted to accommodate the means 21 for preventing mutual rotation of the tubular protective elements 20, i.e., specifically, the channels 21. The external annular element 92 can be made advantageously of polymeric material.

Moreover, the supporting bush 90 can comprise an annular gasket 94 that is fixed to the internal annular element 91.

The radial notches 93 of the external annular element 92 are equal to the number of channels 21 present on the tubular protective element 20 and replicate the profile of the internal cross-sections of the tubular protective element 20. This correspondence between the geometry of the external annular element 92 and the cross-section of the tubular protective element 20 generates a constraint between the two elements, that are thus constrained for mutual rotation. The external annular element 92 has furthermore a discontinuity 98, which allows the widening of its diameter and its mounting inside the recess 95 provided circumferentially on the outer surface of the internal annular element 91. The inner surface 96 of the external annular element 92 comes into contact with the inner surface of the recess 95 of the internal annular element 91, and it is at the interface between such surfaces that sliding occurs and relative rotation between the tubular protective elements 10, 20 and the transmission shafts 2, 3 is allowed. In the inner surface, the second annular element 91 has a further recess 97, in which it is possible to accommodate the annular gasket 94, which prevents the entry of dirt in the contact and sliding area between the two transmission shafts 2, 3 and holds the lubricant inside.

Operation of the protective device for universal joint transmissions is clear and evident from what has been described.

In practice it has been found that the protective device for universal joint transmissions, according to the present invention, achieves the intended aim and objects, since it allows to simplify the steps of assembly and maintenance of the protective device.

Another advantage of the protective device for universal joint transmissions, according to the invention, consists in that it facilitates the mounting of the universal joint on the power take-offs and its release.

A further advantage of the protective device, according to the invention, resides in that the alignment between the several parts of the protective device and the unambiguous angular configuration for assembly ensure the match between the inspection holes present in the device and the internal elements of the universal joint transmission, as well as access to the internal oilers or grease fittings, periodic lubrication of the elements in relative movement being required.

A further advantage of the protective device, according to the invention, resides in that it prevents damage of the protection, in presence of radial external loads, due to of the presence of the supporting bush 90.

Another advantage of the protective device, according to the invention, resides in that it requires the rotational constraint of only one end of the device, in order to prevent the rotation of the entire device.

The protective device for universal joint transmissions thus conceived is susceptible of numerous modifications and variations, all of which are within the scope of the appended claims.

All the details may further be replaced with other technically equivalent elements.

In practice, the materials used, so long as they are compatible with the specific use, as well as the contingent shapes and dimensions, may be any according to requirements and to the state of the art.

The disclosures in Italian Patent Application No. MO2013A000219 from which this application claims priority are incorporated herein by reference.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A protective device for a universal joint transmission, comprising:
    at least two coaxial tubular protective elements that are associated telescopically with each other and are adapted to accommodate the telescopic shafts of the universal joint transmission;
    a locator flange associated rigidly with each of the two protective tubular elements;
    a protective hood, adapted to surround a joint of the universal joint transmission, wherein the protective hood comprises:
        a coupling flange that is coaxial to the locator flange abuts against the locator flange,
        a cylindrical accordion portion supported by the coupling flange, and
        at least one fastening element to fasten the coupling flange on the locator flange; and
    at least one supporting ring that comprises engagement means for positively retaining the supporting ring with the locator flange and preventing disassembly of the supporting ring from the locator flange, the supporting ring being rotatable in an annular seat provided at the outer surface of the joint in order to support the protective device.

2. The protective device according to claim 1, wherein the two coaxial tubular protective elements, associated telescopically with each other, comprise means for preventing mutual rotation.

3. The protective device according to claim 1, wherein the engagement means comprise hook-shaped teeth extending from the supporting ring, wherein the hook-shaped teeth are received in receptacles formed in the locator flange to positively retain the supporting ring with the locator flange and prevent disassembly of the supporting ring from the locator flange.

4. The protective device according to claim 1, wherein the coupling flange comprises an annular recess that engages an edge of the cylindrical accordion portion, which protrudes radially toward the inside of the cylindrical accordion portion, the coupling flange comprising at least one longitudinal notch to accommodate at least one protrusion provided in the cylindrical accordion portion at the protruding edge.

5. The protective device according to claim 1, wherein locator flange comprises alignment means for the alignment of the locator flange with the tubular protective element.

6. The protective device according to claim 1, further comprising a supporting bush that is interposed between the tubular protective elements and the telescopic transmission shafts, wherein the supporting bushing avoids the flexing of the protective tubes and to contrast the action of external loads in a radial direction.

7. The protective device according to claim 6, wherein the supporting bush comprises:
    an internal annular element that rotates integrally with the transmission shaft, and
    an external annular element that rotates integrally with the tubular protective element, the external annular element comprising radial notches to accommodate means for preventing mutual rotation of the tubular protective element.

8. The protective device according to claim 7, wherein the supporting bush comprises an annular gasket that is fixed to the internal annular element.

9. A protective device for a universal joint transmission, comprising:
    two coaxial tubular protective elements that are associated telescopically with each other and are adapted to accommodate the telescopic shafts of the universal joint transmission;
    a locator flange associated rigidly with each of the two protective tubular elements;
    a protective hood, adapted to surround a joint of the universal joint transmission, wherein the protective hood comprises:
        a coupling flange that is coaxial to the locator flange abuts against the locator flange,
        a cylindrical accordion portion supported by the coupling flange, and
        at least one fastening element to fasten the coupling flange on the locator flange; and
    a supporting ring that comprises engagement means for engaging the supporting ring with the locator flange, the supporting ring being rotatable in an annular seat provided at the outer surface of the joint in order to support the protective device,
    wherein the locator flange comprises a radially protruding portion that is adapted to engage in a corresponding radial recess provided in the coupling flange to ensure the coupling flange is correctly aligned with the locator flange.

10. The protective device according to claim 9, wherein the locator flange comprises circular teeth that protrude radially toward the inside of the locator flange and are adapted to enter corresponding holes provided in the tubular protective element.

11. The protective device according to claim 9, wherein the coupling flange comprises an annular recess that engages an edge of the cylindrical accordion portion, which protrudes radially toward the inside of the cylindrical accordion portion, the coupling flange comprising at least one longitudinal notch to accommodate at least one protrusion provided in the cylindrical accordion portion at the protruding edge.

12. The protective device according to claim 9, wherein locator flange comprises alignment means for the alignment of the locator flange with the tubular protective element.

13. The protective device according to claim 9, further comprising a supporting bush that is interposed between the tubular protective elements and the telescopic transmission shafts, wherein the supporting bushing avoids the flexing of the protective tubes and to contrast the action of external loads in a radial direction.

14. The protective device according to claim 13, wherein the supporting bush comprises:
    an internal annular element that rotates integrally with the transmission shaft, and
    an external annular element that rotates integrally with the tubular protective element, the external annular element comprising radial notches to accommodate means for preventing mutual rotation of the tubular protective element.

15. The protective device according to claim 14, wherein the supporting bush comprises an annular gasket that is fixed to the internal annular element.

16. A protective device for a universal joint transmission, comprising:
    two coaxial tubular protective elements that are associated telescopically with each other and are adapted to accommodate the telescopic shafts of the universal joint transmission;
    a locator flange associated rigidly with each of the two protective tubular elements;
    a protective hood, adapted to surround a joint of the universal joint transmission, wherein the protective hood comprises:
        a coupling flange that is coaxial to the locator flange abuts against the locator flange,
        a cylindrical accordion portion supported by the coupling flange, and
        at least one fastening element to fasten the coupling flange on the locator flange; and
    a supporting ring that comprises engagement means for engaging the supporting ring with the locator flange, the supporting ring being rotatable in an annular seat provided at the outer surface of the joint in order to support the protective device,
    wherein the locator flange comprises circular teeth that protrude radially toward the inside of the locator flange and are adapted to enter corresponding holes provided in the tubular protective element.

17. The protective device according to claim 16, wherein the coupling flange comprises an annular recess that engages an edge of the cylindrical accordion portion, which protrudes radially toward the inside of the cylindrical accordion portion, the coupling flange comprising at least one longitudinal notch to accommodate at least one protrusion provided in the cylindrical accordion portion at the protruding edge.

18. The protective device according to claim 16, wherein locator flange comprises alignment means for the alignment of the locator flange with the tubular protective element.

19. The protective device according to claim 16, further comprising a supporting bush that is interposed between the tubular protective elements and the telescopic transmission shafts, wherein the supporting bushing avoids the flexing of the protective tubes and to contrast the action of external loads in a radial direction.

20. The protective device according to claim 19, wherein the supporting bush comprises:
    an internal annular element that rotates integrally with the transmission shaft, and
    an external annular element that rotates integrally with the tubular protective element, the external annular element comprising radial notches to accommodate means for preventing mutual rotation of the tubular protective element.

* * * * *